United States Patent [19]
Coatta et al.

[11] Patent Number: 5,407,316
[45] Date of Patent: Apr. 18, 1995

[54] RAPID, COMPACT, HIGH DENSITY STORAGE OF CARGO CONTAINERS

[76] Inventors: Bernard J. Coatta, 404 - 1330 Quayside Drive, New Westminster, B. C., Canada, V3M 6H1; John E. Hargreaves, 26 - 19171 Mitchell Road, Pitt Meadows, B. C., Canada, V3Y 2C5; Terry J. Coatta, 3831 Richmond Street, Richmond, B. C., Canada, V7E 2W5; Raymond J. Smithson, 4216 Dundas Street, Burnaby, B. C., Canada, V5C 1B1

[21] Appl. No.: 78,459

[22] Filed: Jun. 16, 1993

Related U.S. Application Data

[63] Continuation-in-part of Ser. No. 746,958, Aug. 19, 1991, abandoned, which is a continuation-in-part of Ser. No. 487,615, Mar. 2, 1990, abandoned.

[51] Int. Cl.⁶ ............................................. B65G 1/133
[52] U.S. Cl. ...................................... 414/787; 414/277
[58] Field of Search ............. 414/266, 268, 277–282, 414/787, 331, 560, 561; 212/221; 198/347.3

[56] References Cited

U.S. PATENT DOCUMENTS

| | | | |
|---|---|---|---|
| 2,700,448 | 1/1955 | Ames | 198/347.3 |
| 3,240,365 | 3/1966 | King | 414/280 X |
| 3,480,162 | 11/1969 | Saul | 414/282 |
| 3,547,282 | 12/1970 | Hartbauer et al. | 414/266 |
| 3,622,020 | 11/1971 | Sarvary | 414/279 |
| 3,630,402 | 12/1971 | Young | 414/434 |
| 3,750,804 | 8/1973 | Lemelson | 414/278 X |
| 3,782,565 | 1/1974 | Doran et al. | 414/277 |
| 3,792,785 | 2/1974 | Weir | 414/278 |
| 3,805,974 | 4/1974 | Andersson et al. | 414/278 X |
| 4,014,442 | 3/1977 | Adelson et al. | 414/282 |
| 4,085,759 | 4/1978 | Seragnoli | 198/347.3 X |
| 4,150,758 | 4/1979 | Mascherpa | 414/282 |
| 4,205,936 | 6/1980 | Green | 414/266 X |
| 4,395,180 | 7/1983 | Magnotte | 414/282 |
| 4,529,081 | 7/1985 | Tanaka | 414/278 X |
| 4,872,800 | 10/1989 | Gutov et al. | 414/278 X |
| 4,887,953 | 12/1989 | Greub | 414/277 X |
| 4,923,354 | 5/1990 | Giuliano et al. | 414/787 X |
| 5,125,782 | 6/1992 | Goldschmidt et al. | 414/278 |

FOREIGN PATENT DOCUMENTS

| | | | |
|---|---|---|---|
| 1212879 | 3/1966 | Germany . | |
| 56402 | 5/1981 | Japan | 414/280 |
| 26702 | 2/1983 | Japan | 414/280 |

Primary Examiner—David A. Bucci
Attorney, Agent, or Firm—Chernoff, Vilhauer, et al.

[57] ABSTRACT

A multi-level cargo container storage rack. A container transport aisle extends through the rack from top to bottom and between opposed ends of the rack. A plurality of container storage positions are provided on each level and on each side of the aisle. A container elevator vertically displaces containers within the aisle to a selected level. A container transfer mechanism transfers containers between the elevator and a selected side of the selected level. The storage positions on each side of the aisle are displaceable toward or away from the aisle, along each of the levels. A programmed computer drives the system.

19 Claims, 26 Drawing Sheets

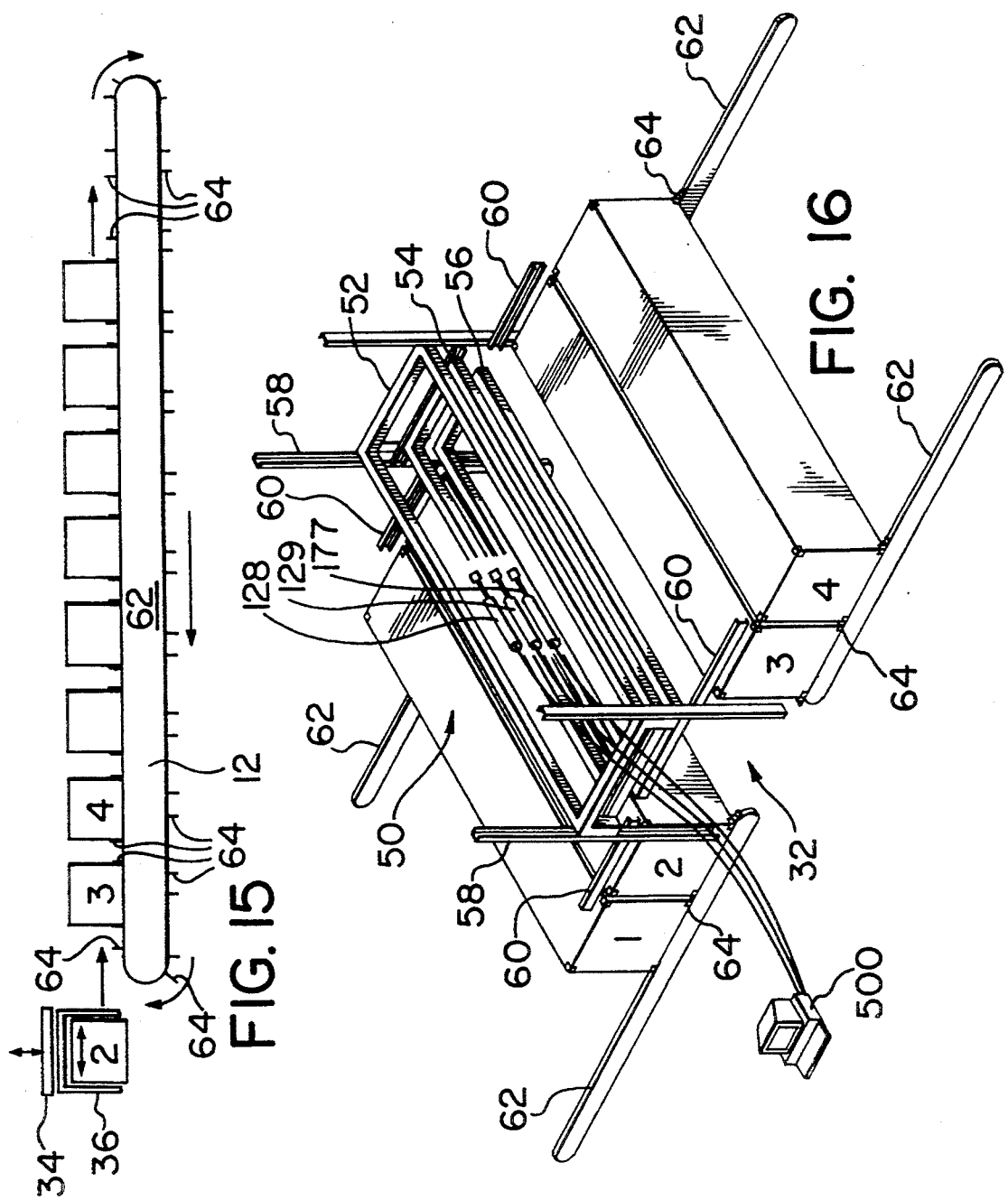

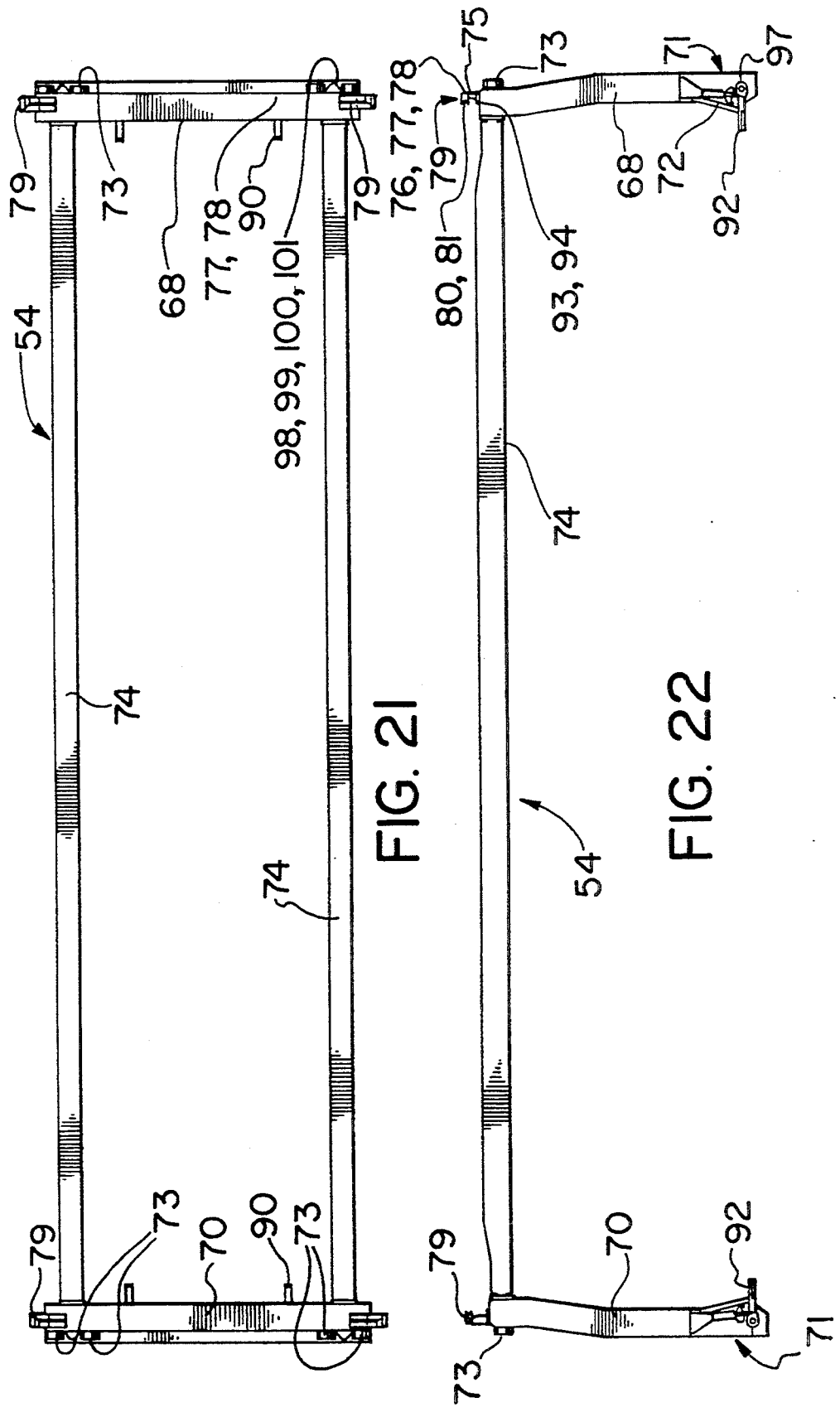

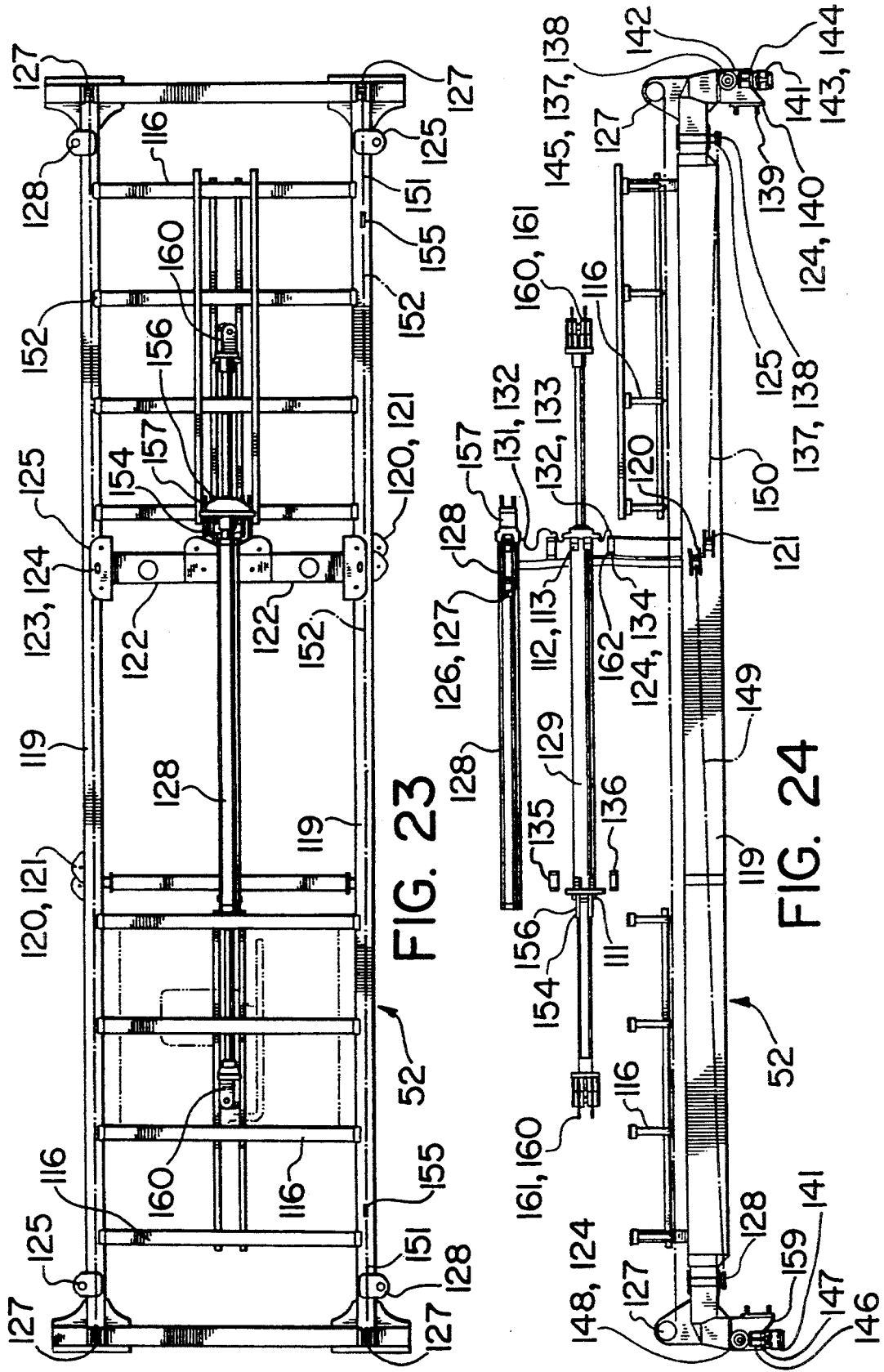

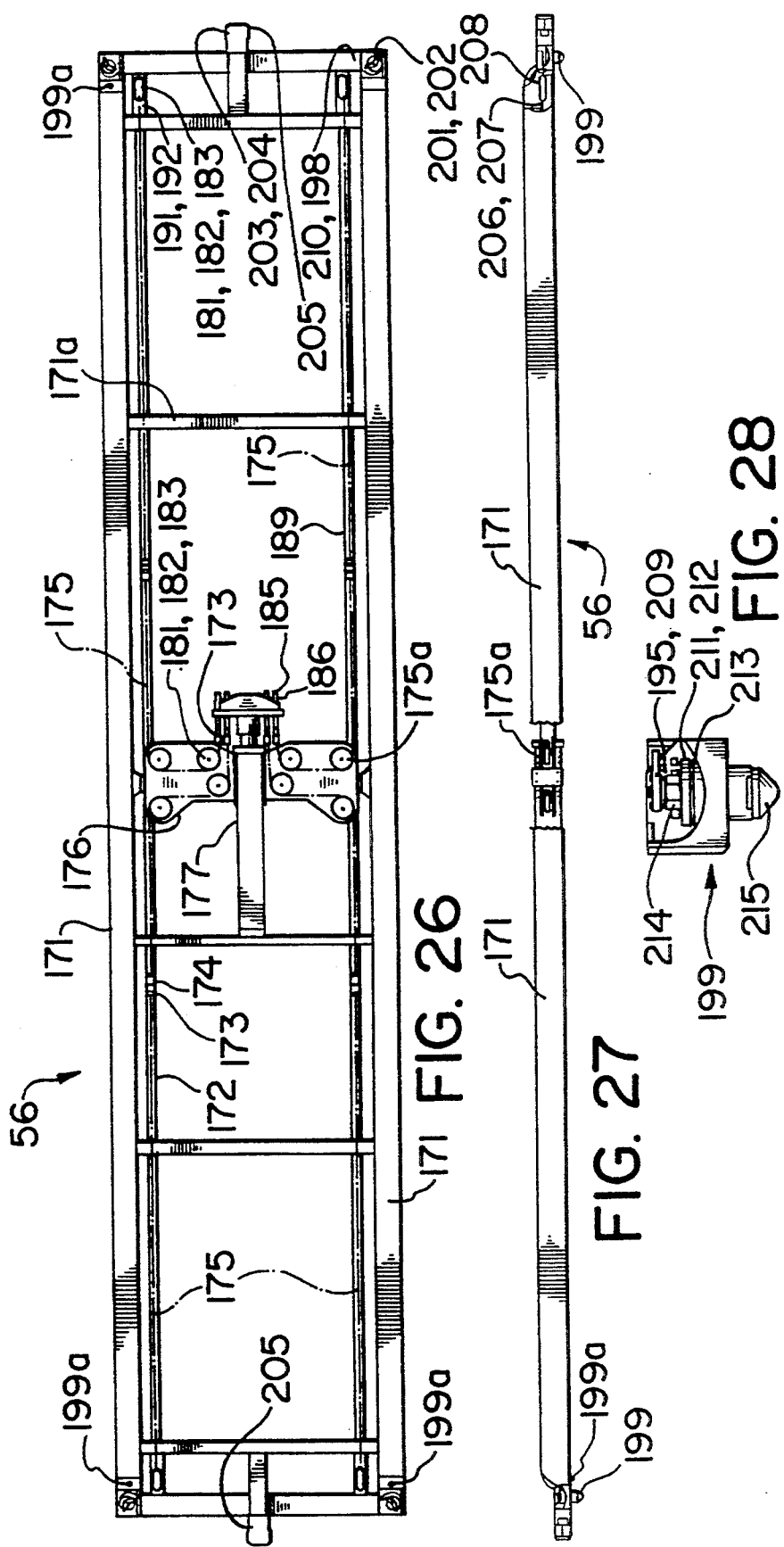

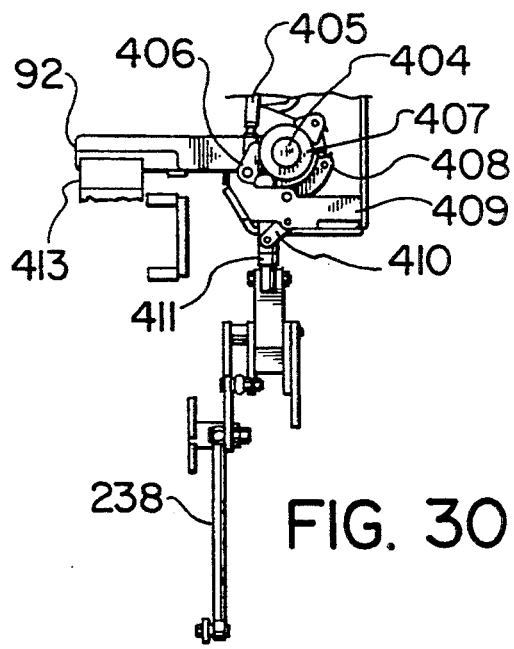
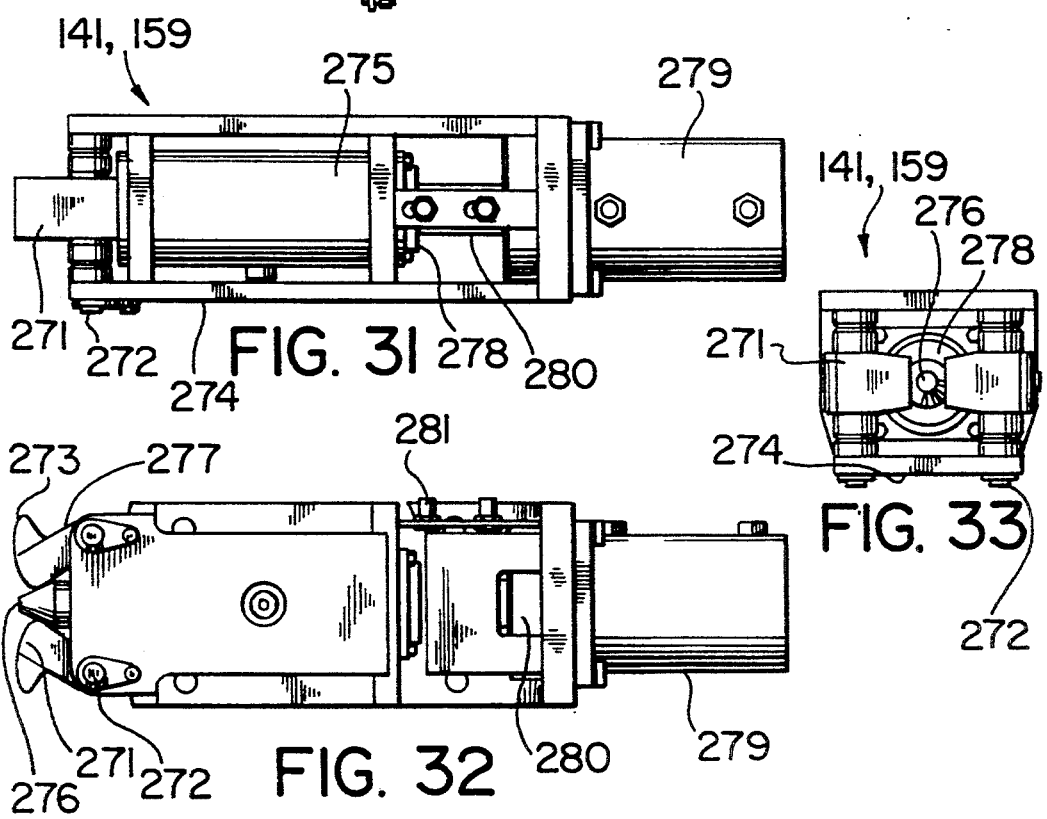

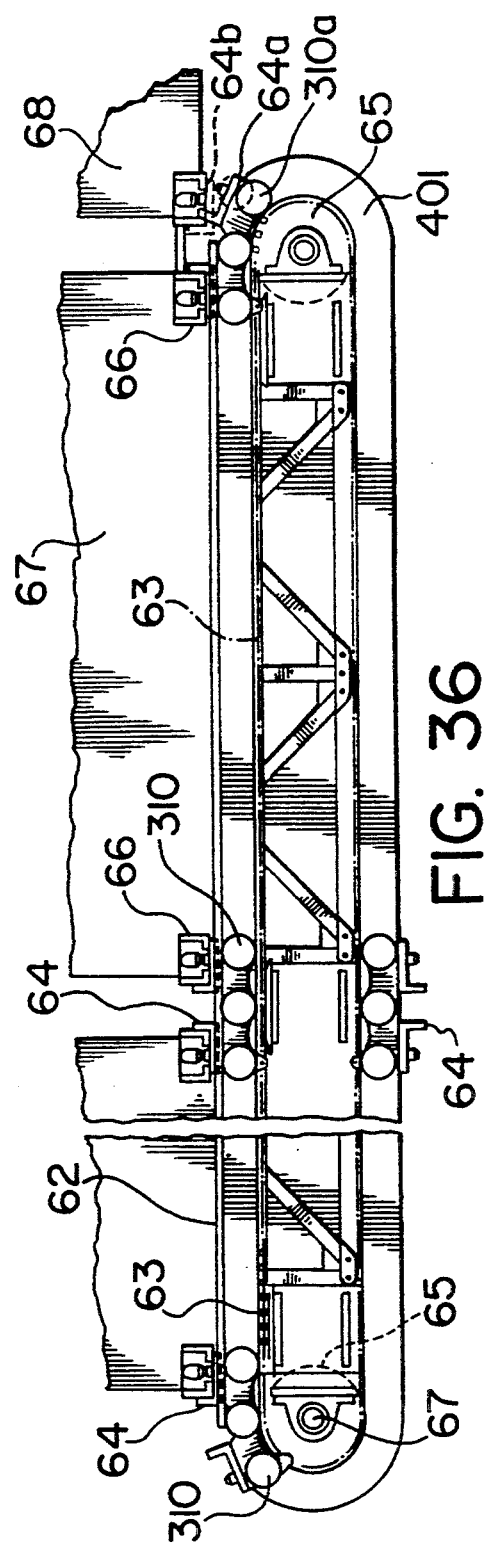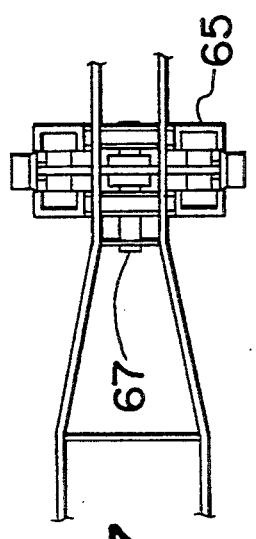
FIG. 36
FIG. 37

RAPID, COMPACT, HIGH DENSITY STORAGE OF CARGO CONTAINERS

This application is a continuation-in-part of application Ser. No. 07/746,958, filed Aug. 19, 1991, now abandoned, which is a continuation-in-part of application Ser. No. 07/487,615, filed Mar. 2, 1990, now abandoned.

FIELD OF THE INVENTION

This application pertains to a novel apparatus and method for the efficient storage of International Standards Organization (ISO) cargo containers in a multi-level rack capable of receiving multiple containers on each level under programmed control.

BACKGROUND OF THE INVENTION

In 1958, a retired materials handling engineer in Pittsburgh, Pa., U.S.A., named Herbert H. Hall, prepared a technical paper for the American Society of Mechanical Engineers describing a modular series of large freight containers which could move in global interchange. The object was to achieve greater efficiencies and economies in transport by being able to have the shipper select that size of container which best suited his cargo and still enjoy the benefits of interchangeability with the sizes in the same series. Mr. Hall's paper was introduced into ISO/TC 104 (document 104 N 2) upon initiation of the ISO project in 1961. It was his thinking that proved to be the guiding light for the Technical Committee's work. It was his logic that ultimately emerged to become the foundation for the present ISO International Standards in this field.

The early work of TC 104 called for careful analysis of the operational environment within which the containers would move. Calculations had to be made, and confirmed by test, of all the accelerations and decelerations that might be encountered in typical intercontinental container operations. From these data came the basic requirements for the construction of the Standard Containers. The fact that containers in service have borne up so well structurally is a testimonial to the thoroughness and accuracy of the Committee's early work.

In the abstract, TC 104 identified for all containers, eight points in space, prescribing their exact coordinates and thereby defining the dimensions and tolerances of the "outer envelope" of the container sizes. These were to locate the corner fittings of every container regardless of type. Next the Committee specified what external forces would have to be sustained by the container at these points. Gravitational loads caused, for example, by stacking containers on one another, or inertial loads caused, for example, by the pitching and rolling of a ship, all had to be established. Then internal loads had to be defined, such as those introduced by the cargo bearing against the inside walls of the container. Test methods were also created that reflected the routine service conditions encountered in normal operations, making allowances for the fluctuations that were likely to occur.

Out of this approach came a container system that permitted dimensional and functional interchangeability among all of the container types. If at some future time a unique type of container might be required and developed, the application of the basic guidelines for the Standard Container will assure compatibility with the existing ISO handling and transport environment.

Inbound cargo shipping containers (sometimes called containerized cargo or freight containers) are conventionally unloaded from container ships by cranes and transported by container carrying vehicles to a dockside container storage yard. The same cranes and vehicles are used to transport outbound containers from the container yard and load them onto container ships for export.

If the container yard is large relative to the number of containers which must be stored then the containers are laid on the ground in rows. If the container yard is small relative to the number of containers which must be stored (as is typically the case) then the containers are stacked atop one another to conserve valuable space.

A freight container is not simply a large steel box with a flat bottom which may be placed, for example, on a conveyor belt and moved along like a huge pallet. In fact, a freight container can only be lifted by or stored on its corner castings, which are relatively very small, 6.5 ins.×6 ins. (164.5 mm×149.0 mm). Apart from these four small corner fitting castings, the bottom of a container typically consists of a number of fairly light gauge crossbeams about one foot (30 cm) apart which sustain a wooden floor. The crossbeams are typically attached to the floor angle or bottom of the side plating and neither they, nor the floor angle, touch the supporting surface when the container is in storage.

When ISO freight (cargo) containers (hereafter termed "containers") are stacked one upon another, they must be vertically aligned so that the weight of the upper container(s) is transmitted vertically downwards from the corner castings of the upper container to the upper corner castings of the container below and thence, via the strong (in compression) corner posts, directly to the bottom corner castings of the lowest container. Containers normally have sufficient strength to sustain no more than four other loaded containers above them (subject to the weight in each individual container), provided always that the stack is properly placed with each container's bottom corner castings standing directly upon the upper corner castings of the container below.

A standard freight container has large doors at one end which significantly reduce the container's ability to withstand transverse racking forces which would be imposed upon it if one side were to be raised above the other.

Containers stored in the storage yard are commonly shuffled from one location to another in a continuous effort to speed the loading and unloading of container ships. For example, a group of containers may be moved to clear an area in the yard to receive an inbound shipload of containers. The inbound containers can be unloaded and moved into the cleared common storage area more quickly than would be the case if each inbound container had to be moved into a random storage location in the yard. Similarly, a group of outbound containers may be moved into a pre-cleared yard storage area in preparation for loading the entire group of outbound containers onto a ship which is about to arrive, or which is being unloaded. The outbound containers can be loaded onto the ship from a common storage area more quickly than would be the case if each outbound container had to be moved to the ship from a random storage location in the yard. Similarly, containers may be moved so as to gain access to a particular inbound container for which road or rail transport has arrived.

The continuous shuffling and lifting of stored containers causes a number of problems. Although records are usually kept of the yard location in which each newly arriving container is stored, those records are often not updated to reflect every shuffling movement of each container. For example, if an outbound container is stacked beneath two other containers which are not outbound, then those two must be lifted off the outbound container and moved to another storage location before the outbound container can be moved. The other two containers are not normally moved back into the stack location from which they were moved. Moreover, the operator who moves them may not note their new location(s) in the yard's records. Even though those two containers may be moved only a short distance, confusion can result when they have to be located for loading or for transport to an outbound ship, especially if they are repeatedly moved in a series of unrelated shuffling operations. Valuable time is wasted while "lost" containers are located.

The ability to manage container placement and movements is also adversely affected by the inability to precisely locate and track the movement of individual containers within the yard. Even if a container's location is known, repeated shuffling operations may have "buried" that container beneath and/or behind many other containers, all of which must be moved (i.e. shuffled) to gain access to the desired container. Repeated container shuffling also increases the potential for damaging the containers.

Computerized systems have been developed to automate the process of locating and tracking individual containers stored within a container yard. However, because such systems typically rely on human driven vehicles to move containers, they require human operator input to indicate that containers have been shuffled into different locations. Such systems are therefore subject to the same problems that are outlined above if the vehicle operator fails to input information respecting each and every container movement. In a busy container yard, with many simultaneous container movements continually ongoing, it is impractical to record each and every container movement. Even if the location of every container in the yard is known, and even if every container movement is tracked to reflect the new location of every shuffled container, significant time is still required for conventional container handling equipment to shuffle the containers about the yard and transport them to and from container ships.

The following two patents disclose cargo moving and storage systems.

Greub, U.S. Pat. No. 4,887,953, provides a storage system of endless bucket belts $P_1$, $P_2$, $P_3$, $P_4$, etc. Each belt carries a plurality of shelves or gondolas $R_1$, $R_2$, $R_3$, $R_4$, etc. A control means operates motors $M_1$, $M_2$, $M_3$, $M_4$, etc. which actively drive the respective belts to bring selected shelves or gondolas into position adjacent a shelf serving apparatus 3 capable of loading the shelves/gondolas with containers or retrieving containers from the shelves/gondolas. Greub does not disclose apparatus which move only in response to displacement of a container off of or onto an elevator.

Lemelson, U.S. Pat. No. 3,750,804, teaches a warehousing system with storage racks and the location of a transport aisle between opposed ends of a rack. A stacker crane is located in the aisle. Conveyorized storage racks are also used.

The mechanisms and systems patented by Lemelson and Greub both involve endless belt conveyors for the lateral movement and some degree of tilting while transferring the stored object to and from the elevator. They make no provision whatsoever for the support of the containers by the corners only and, especially in the case of the device of Lemelson, make no provision for the large forces involved when moving cargo containers which can weigh up to 34 Metric tonnes each. Neither of the mechanisms disclosed could possibly handle or store freight containers.

Sarvary, U.S. Pat. No. 3,622,020, discloses a three-dimensional pallet-storage system wherein goods are stored in pallets at a plurality of different storage levels and in a plurality of rows of storage locations at each level. Pallets are removed from an area of bulk storage by means of a transfer trolley and conveyed to a pallet replenishment area. A picking tower is located adjacent a live store area and has associated therewith a two-directional transfer device capable of removing pallets from the live store, to a point adjacent a handler, transferring the pallet after unloading of the goods in a direction normal to the direction of removal and then moving the pallet in the opposite direction from the removal direction to insert the pallet in an empty row of the live store. The transfer trolley and two-directional transfer device both have at least one cross travel member to effect the transfer of the pallets from one storage location to another.

Hartbauer, U.S. Pat. No. 3,547,282, discloses an apparatus for and method of removably storing a plurality of boxlike containers each of which is adapted to receive therein a substantial number of articles such as cartons of facial tissue. The apparatus includes a storage bank adapted to have such boxes or containers inserted through the front face of the storage bank into one of a plurality of openings therein which are arranged in horizontal rows and vertical tiers, each of the boxes when inserted into the storage bank being automatically coupled in tandem orientation to a preceding box previously inserted into the same opening and at the same time being operative to displace such preceding box inwardly toward the rear of the storage bank. The apparatus further includes a box transporter mechanism having moving elements cooperating with elements provided by the box to pick up the boxes individually at a pickup station and then transport each such box to a desired location or opening along the storage bank and insert the box thereinto, the transporter mechanism also being used for subsequently removing boxes from the storage bank and for transporting the boxes to a discharge station. Upon such removal of a box from the storage bank, the box is automatically uncoupled from a preceding box immediately therebehind after the latter box has been advanced to a forward position adjacent the front face of the storage bank. The transporter mechanism includes an elevator cage movable vertically so as to handle boxes at different levels and it further includes a conveyor mechanism arranged with the elevator cage for vertical movement therewith, but also being movable horizontally with respect to the elevator cage for the purpose of picking up, discharging, and inserting boxes into and removing them from the storage bank.

U.S. Pat. No. 3,792,785, Weir, discloses an automated freight terminal wherein a plurality of stacker cranes transfer shipments between load-unload boom conveyors, shipment staging compartments, and an indexable distribution conveyor comprised of a series of interconnected carts. The stacker cranes are provided with elevators, and each elevator supports an endless belt conveyor that can be side-shifted toward selected carts of the distribution conveyor or toward staging compartments which components are also provided with endless belt conveyors. The conveyors on the carts or in the staging compartments are powered from the stacker crane conveyor, and shipments can be moved off the crane conveyor onto the conveyors of the compartments or cart, or vice versa. Incoming freight shipments are routed from a truck to a boom conveyor to a stacker crane, and the stacker crane transfers the shipments directly to the staging compartments or to the distribution conveyor for transfer to the operating area of another stacker crane. The distribution conveyor is indexed in predetermined distances to bring different sets of carts to the stacker cranes so that shipments can be routed anywhere in the terminal. Outgoing freight shipments are handled in a reverse manner.

U.S. Pat. No. 4,085,759, Seragnoli, discloses a system for connecting n cigarette manufacturing machines by a cigarette container feeding apparatus to the loading mechanism of the grouping hopper of a packeting machine. Each manufacturing machine has means for filling single successive containers. Empty containers are rhythmically supplied and removed, and full ones removed and supplied, by stepwise moving conveyor devices, with the aid of storage conveyor devices to compensate for output unbalances between the several machines. The speed of the packeting machine is substantially equal to the sum of the operating speed in the time unit of the n manufacturing machines and the speed of each of said n machines is equal to v/n. The system comprises, for each manufacturing machine, a transfer device group having a pair of transfer devices, for respectively transferring full and empty containers; a storage conveyor device for bidirectional intermittent movement; and a memory device connected to each manufacturing machine and to the packeting machine and arranged to control actuating means of each transfer device, once every n steps of the conveyors, to compensate for operating unbalances of the machines.

Neither of these systems disclose or relate to a facility for handling large heavy ISO containers.

SUMMARY OF THE INVENTION

The present invention provides a programmable, compact, high density container storage apparatus which facilitates precise location of every stored container; precise tracking of every container movement; and, controllable container shuffling capable of significantly reducing the time required to move selected containers between container ships and the container storage apparatus. Valuable storage space is kept to a minimum. Containers are sorted and moved efficiently in minimum time.

The invention provides a multi-level container storage rack. One or more container transport aisle(s) extend(s) through the rack from top to bottom and between opposed ends of the rack. A plurality of container storage positions are provided on each of the levels and on each side of the aisle. Container elevator means are provided for vertically displacing containers within the aisle(s) to a selected one of the levels. For each elevator means, a container transfer means is also provided for transferring containers between the container elevator means and a selected side of the selected level. The storage positions on each side of the aisle are preferably displaceable toward or away from the aisle, along each of the levels.

Preferably, at one side of the unit, an elevator means, complete with a container transfer means, may be provided which is capable of transferring containers to and from any of the container storage levels on that side to and from a position or positions from which they may be lifted by an intermodal transfer means.

The container transfer means laterally transfers inbound containers from the container elevator means onto the selected side of the selected level. Storage positions on each side of the aisle are interconnected (advantageously, in endless loop fashion) such that transfer of a container from the container elevator displaces, away from the aisle, containers previously transferred onto the side of the level to which the container is transferred. In other words, the container transfer means transfers the container from the elevator into a storage position adjacent the aisle on a selected side of the selected level, which in turn displaces all other storage positions on the selected side of the selected level one storage position away from the aisle.

The container transfer means transfers outbound containers from the selected side of the selected level onto the container elevator means. Transfer of a container from a selected side of a selected level onto the elevator displaces, toward the aisle, containers remaining on the selected side of the selected level. The container transfer means therefore transfers the container from a storage position adjacent the aisle on a selected side of a selected level onto the elevator, which in turn displaces all other storage positions on the selected side of the selected level one storage position towards the aisle.

The invention is directed to an apparatus for handling and storing International Standards Organization (ISO) cargo containers having four top corners and four bottom corners and fittings at all eight corners comprising: (a) a cargo container storage rack having a top, a bottom, a first end and a second end and at least two locations for storage of cargo containers; (b) at least one cargo container transport aisle extending through or adjacent said storage rack from the bottom to the top thereof and from the first end to the second end of said rack; (c) a plurality of cargo container storage positions on each of said locations and on one or both sides of said aisle, said cargo container storage positions being spaced from each other; (d) each of said spaced container storage positions on one or both sides of said aisle being laterally displaceable, toward or away from said aisle in unison, at each of said locations, by means which has a plurality of individual cargo container holding saddles thereon, which saddles are respectively adapted to engage the four respective bottom corner fittings of a container; (e) cargo container elevator means for accepting cargo containers by engaging the bottom of at least four opposite corners on the same level of a cargo container and displacing the cargo containers within said aisle to a selected one of said locations, said elevator means being adapted to prevent shifting of the container out of alignment when the container is moved; and (f) cargo container transfer means associated with the container elevator means for laterally transferring cargo containers between said cargo container elevator means and a selected side of said selected location, to engage or disengage the fittings of the four bottom corners of a cargo container with or from said respective container holding saddles.

In the apparatus, the movement and storage positions of the cargo containers can be controlled by programmed computing means.

Said cargo container storage positions on each side aisle can be interconnected by an endless loop and corner fitting engaging and holding saddles at each position such that transfer of a cargo container from said cargo container transfer means onto said selected side of said selected location displaces cargo containers previously transferred onto said selected side of said selected location away from said aisle one cargo container storage position, and removal of a cargo container from said selected side of said selected location by said cargo container transfer means displaces cargo containers previously transferred onto said selected side of said selected location one cargo container storage position towards said aisle.

The invention is also directed to an apparatus for handling and storing International Standards Organization cargo containers which have four top corners with fittings and four bottom corners with fittings comprising: (a) a multi-level cargo container storage rack; (b) at least one container transport aisle extending along said rack from top to bottom and between opposed ends of said rack; (c) a plurality of cargo container storage positions on each level of said rack, said cargo container storage positions being spaced from one another and horizontally displaceable, toward or away from said aisle, along each of said levels; (d) cargo container elevator means for engaging at least four fittings of a cargo container and vertically displacing the cargo container within said aisle to a selected one of said rack levels; and (e) cargo container transfer means for reversibly transferring a cargo container between said cargo container elevator means and said selected rack level; and (f) said cargo container storage positions on each specific rack level having cargo container corner fitting engaging and holding saddles thereon, said saddles engaging the four bottom corner fittings such that transfer of a cargo container from said container transfer means onto said selected rack level displaces, away from said aisle, cargo containers previously transferred onto said rack level, and transfer of a cargo container from said selected level onto said container transfer means displaces toward said aisle, cargo containers remaining on said selected level, said saddles maintaining spatial relationship between adjacent cargo containers on said rack level.

Said container elevator means and said container transfer means can comprise: (a) a shuttle which is adapted to engage at least four corner fittings of a container and move the container laterally in relation to the storage rack; and (b) a hoist which carries the shuttle and a container if applicable and is adapted to move the shuttle, the container and itself, upwardly or downwardly.

The container elevator means and container transfer means can include a spreader which is connected to the shuttle and is adapted to move vertically in relation to the shuttle. The hoist can be of a generally rectangular configuration, and can be adapted to move upwardly or downwardly on four vertically extending guide rails which are positioned at each corner of the hoist. The shuttle can be of a generally rectangular configuration which can be oriented in alignment with the rectangular hoist and can be adapted to move laterally in either direction relative to the hoist. The spreader can be of a generally rectangular configuration which can be aligned with the shuttle and hoist, the spreader being adapted to be raised or lowered relative to the shuttle and hoist.

Horizontal guide rails can extend laterally to an exterior of the rack from each of the four vertical guide rails, the horizontal guide rails being adapted to receive the shuttle when the hoist raises or lowers the shuttle into alignment with the horizontal guide rails.

The storage positions can be laterally extending carrier tracks and the vertical and horizontal guide rails can be associated with the laterally extending carrier tracks, which can have extending around the circumference thereof endless chains and corner fitting engaging saddles which are adapted to receive a cargo container.

The shuttle can have extending downwardly therefrom, at each corner thereof, four arms which carry means for releasably engaging or gripping at least four of the corner castings of a cargo container.

The spreader, shuttle and hoist can be adapted to be moved either in unison or independently of one another by one or more power means which derive power from a power source. The power means can comprise sprockets, chains and hydraulic cylinders, driven by hydraulic pumps or motors.

The spreader, shuttle and hoist can be equipped with electronic microsensors which sense the respective positions of the spreader, shuttle and hoist. The microsensors can be connected to a computer means which is programmed to determine and control the respective positions of the spreader, shuttle and hoist as determined by the microsensors and move the spreader, shuttle or hoist by activating the power means.

A plurality of container carrier assemblies can run on the tracks and can be positionally connected to the chains. The carrier assemblies can have saddles which are adapted to receive the bottom corner castings of a container. The shuttle can be positioned above the hoist.

BRIEF DESCRIPTION OF THE DRAWINGS

In drawings which illustrate specific embodiments of the invention, but which should not be construed as restricting the spirit or scope of the invention in any way:

FIG. 15 is a stylized block diagram representation of the major functional components of the container moving system.

FIG. 16 illustrates an isometric view of a hoist-shuttle-spreader assembly adapted to grip and move any one of four containers, which containers are movably mounted on carrier assemblies.

FIG. 21 illustrates a top view of a shuttle assembly.

FIG. 22 illustrates a side view of a shuttle assembly.

FIG. 23 illustrates a detailed top view of a typical hoist assembly in which the hoist and shuttle drive chains are actuated by means of hydraulic cylinders.

FIG. 24 illustrates a side view of a hoist assembly in the cylinder powered configuration.

FIG. 26 illustrates a top view of a spreader assembly.

FIG. 27 illustrates a side view of a spreader assembly.

FIG. 28 illustrates a detailed view of a twist lock pin.

FIG. 30 illustrates a section view taken along section A—A of FIG. 29.

FIG. 31 illustrates a side view of the hoist latch assembly.

FIG. 32 illustrates a bottom view of the latch hoist assembly.

FIG. 33 illustrates an end view of the hoist latch assembly.

FIG. 36 illustrates an end view of a carrier assembly.

FIG. 37 illustrates a top view of a sprocket wheel of the carrier assembly.

DETAILED DESCRIPTION OF SPECIFIC EMBODIMENTS OF THE INVENTION

Figure 1:
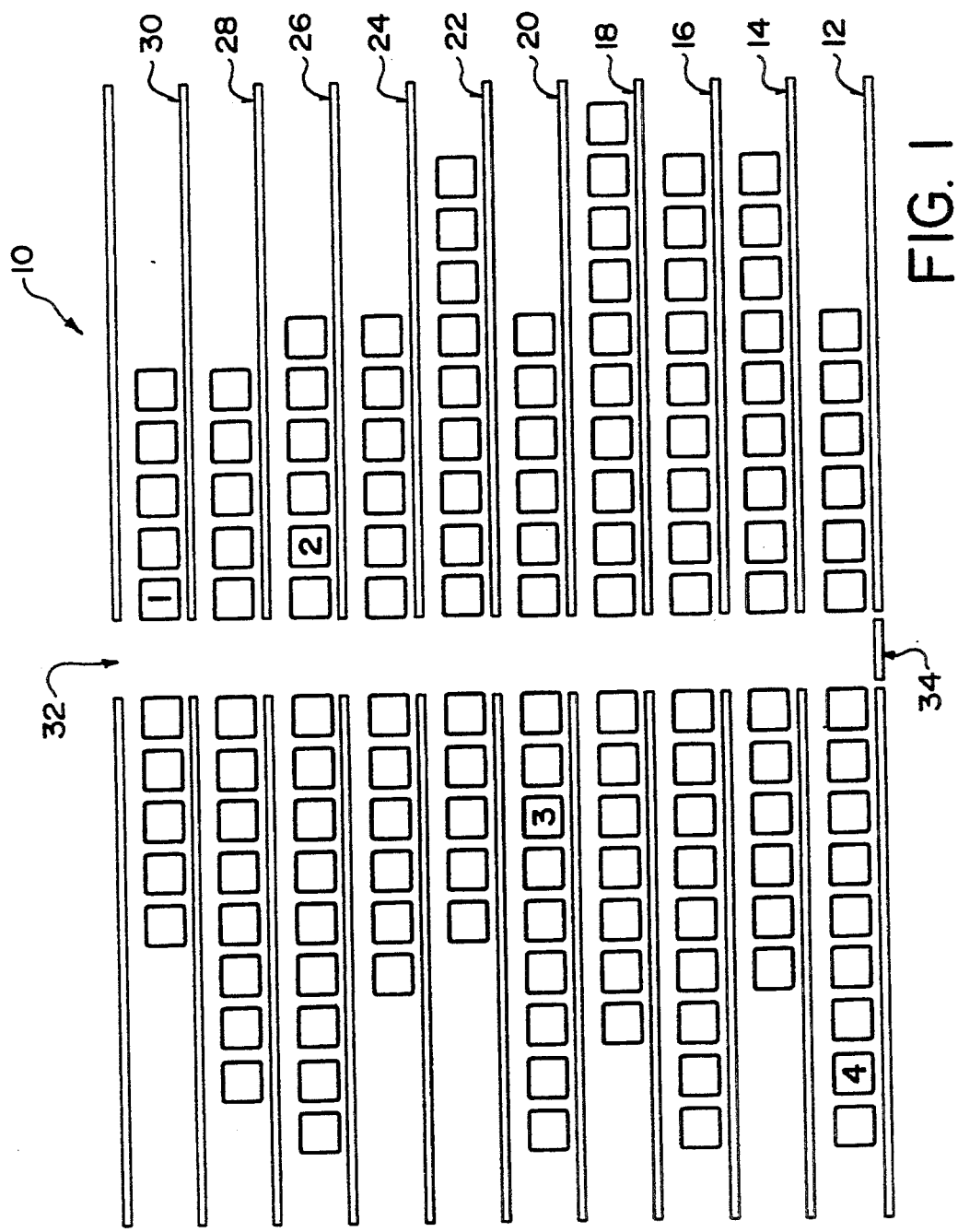
FIGS. 1 through 14 are elevation views showing one end of a cargo container storage apparatus constructed in accordance with a specific embodiment of the invention and depicting an efficient sequence of steps according to the invention by which four selected containers may be retrieved from storage for transportation to a container ship.

FIGS. 1 through 14 illustrate a stylized depiction of a cargo container storage rack 10 having multiple levels 12, 14, 16, 18, 20, 22, 24, 26, 28 and 30 and the sequential efficient manner in which containers can be moved in the system. A suitably anchored framework (not shown) supports rack 10 and containers stored therein. A container transport aisle 32 extends through rack 10 from top to bottom and between opposed ends of rack 10. A plurality of such container storage positions are provided on each of levels 12 through 30, on both sides of aisle 32. Rectangles depict the ends of containers stored in individual storage positions within rack 10. Empty storage positions in rack 10 are denoted by the absence of rectangles at the outer ends of levels 12 through 30, on either side of aisle 32. It should be noted that the containers are spaced from one another and do not abut or impinge upon one another. This is important because containers are reinforced only at the ends and will collapse or be damaged if attempts are made to move them by shoving one container against another.

In general terms, a container elevator means such as a powered hoist, container spreader, crane or elevator 34, which grabs the containers at the top or bottom four corners (or both) which are reinforced and adapted for this purpose, is mounted in aisle 32 for vertically displacing containers within aisle 32 to a selected one of levels 12 through 30. A container transfer means such as a shuttle mechanism 36 or some other means is mounted on elevator 34 for laterally transferring containers between elevator 34 and a selected side of a selected one of levels 12 through 30. The storage positions on each side of aisle 32, which are adapted to fit the bottom four corners of the container, are spatially interconnected so that they may be horizontally displaced in unison toward or away from aisle 32, along each of levels 12 through 30, by the movement of the shuttle mechanism, or the placing or removal of a container at each specific level.

The shuttle mechanism 36 transfers inbound containers from elevator 34 onto a selected side of a selected one of levels 12 through 30. It is important that the shuttle 36 engage the container at four reinforced corners for movement of same. Also, since the containers weigh 40 tons, it is important that means are included to contain the momentum of the containers as they are moved so that they do not shift out of rectangular configuration. Transfer of a container from elevator 34 displaces, away from aisle 32, containers previously transferred onto the same side and level of rack 10 to which the inbound container is transferred. More particularly, the shuttle mechanism 36 transfers the inbound container from elevator 34 into a storage position adjacent aisle 32 on a side and level of rack 10 selected for storage of the inbound container. Because the storage positions are spatially interconnected as aforesaid (and explained in detail later), transfer of the inbound container from elevator 34 frees a storage position adjacent aisle 32 to receive the inbound container by displacing, one storage position away from aisle 32, all other storage positions on the side and level of rack 10 selected for storage of the inbound container.

The shuttle mechanism 36 transfers outbound containers onto elevator 34 from storage positions adjacent aisle 32. Transfer of an outbound container onto elevator 34 displaces, toward aisle 32, any containers remaining on the same side and level from which the outbound container was transferred. More particularly, shuttle mechanism 36 transfers the outbound container from its storage position adjacent aisle 32 onto elevator 34. Because the storage positions are spatially interconnected, transfer of the outbound container onto elevator 34 does not leave an empty storage position adjacent aisle 32. Instead, transfer of the outbound container onto elevator 34 displaces, one storage position toward aisle 32, all other linked storage positions on the side and level of rack 10 from which the outbound container is withdrawn, by dragging the entire group of storage positions (together with any containers stored therein) toward aisle 32 as the outbound container is transferred onto elevator 34. Accordingly, any containers remaining on the same side and level from which the outbound container was transferred remain adjacent one another, with the innermost container immediately adjacent aisle 32. A reversible hydraulic motor or other means, which engages the container at the four top corners, or bottom four corners, or both, may be substituted for the shuttle mechanism 36.

Typical Container Moving Sequence

The operation of elevator (hoist) 34 and double laterally acting shuttle 36 may be programmed in a computer 500 (see FIG. 16) to store, retrieve, and/or shuffle containers in any desired fashion. The construction of the hoist 34 and shuttle 36 are discussed in more detail below in relation to FIGS. 16 and on. The immediate discussion is for the purpose of enabling the reader to understand the overall container handling system. For example, FIGS. 1 through 14 depict one possible sequence of steps by which four outbound containers labelled 1, 2, 3 and 4 previously stored in rack 10 in the positions shown in FIG. 1 may be retrieved for transportation to a container ship. As will be seen, the outbound containers are initially moved into a contiguous group of storage positions on the right hand side of level 12 immediately adjacent aisle 32. The contiguously grouped outbound containers are then sequentially transferred into aisle 32 onto container carrying vehicles which transport the containers to the container ship or elsewhere. Those skilled in the container handling art will recognize that this enables the container yard personnel to plan and schedule container movements with considerable flexibility. For example, outbound containers may be contiguously grouped well before the ship is ready to receive them. As soon as the ship is ready the containers may be transferred to the ship rapidly and efficiently. As will be seen, the exact position of every stored container is always known, notwithstanding complex shuffling of containers stored within rack 10.

The following description illustrates how outbound containers 1 through 4 may be contiguously pregrouped so that they may be sequentially delivered, in ascending numeric order, to the container ship or elsewhere. It will however be understood that the outbound containers need not be grouped before they are delivered, although grouping will speed the container transfer operation, as aforesaid. It will also be understood that the outbound containers may be grouped in any desired sequence.

Container 4 is "buried" on level 12, on the left side of aisle 32, behind seven "static" containers which are to remain in storage. The seven static containers must be shuffled into other storage positions in rack 10 in order to bring container 4 adjacent aisle 32 so that it may be transferred to the grouping area (which, for the purposes of this example, is the right hand side of level 12 immediately adjacent aisle 32). As may be seen by comparing FIGS. 1 and 2, the static container adjacent aisle 32 is transferred onto elevator 34 and lifted to level 14. Withdrawal of the static container from the left side of level 12 laterally displaces (i.e. pulls by means of the spatial interconnection means) all of the containers remaining on the left side of level 12 one storage position toward aisle 32. A suitably programmed computer tracks the movement of each container. When the static container aforesaid is withdrawn from level 12 as aforesaid, the computer updates its records to indicate that the containers remaining on the left side of level 12 have moved one storage position toward aisle 32.

Figure 2:
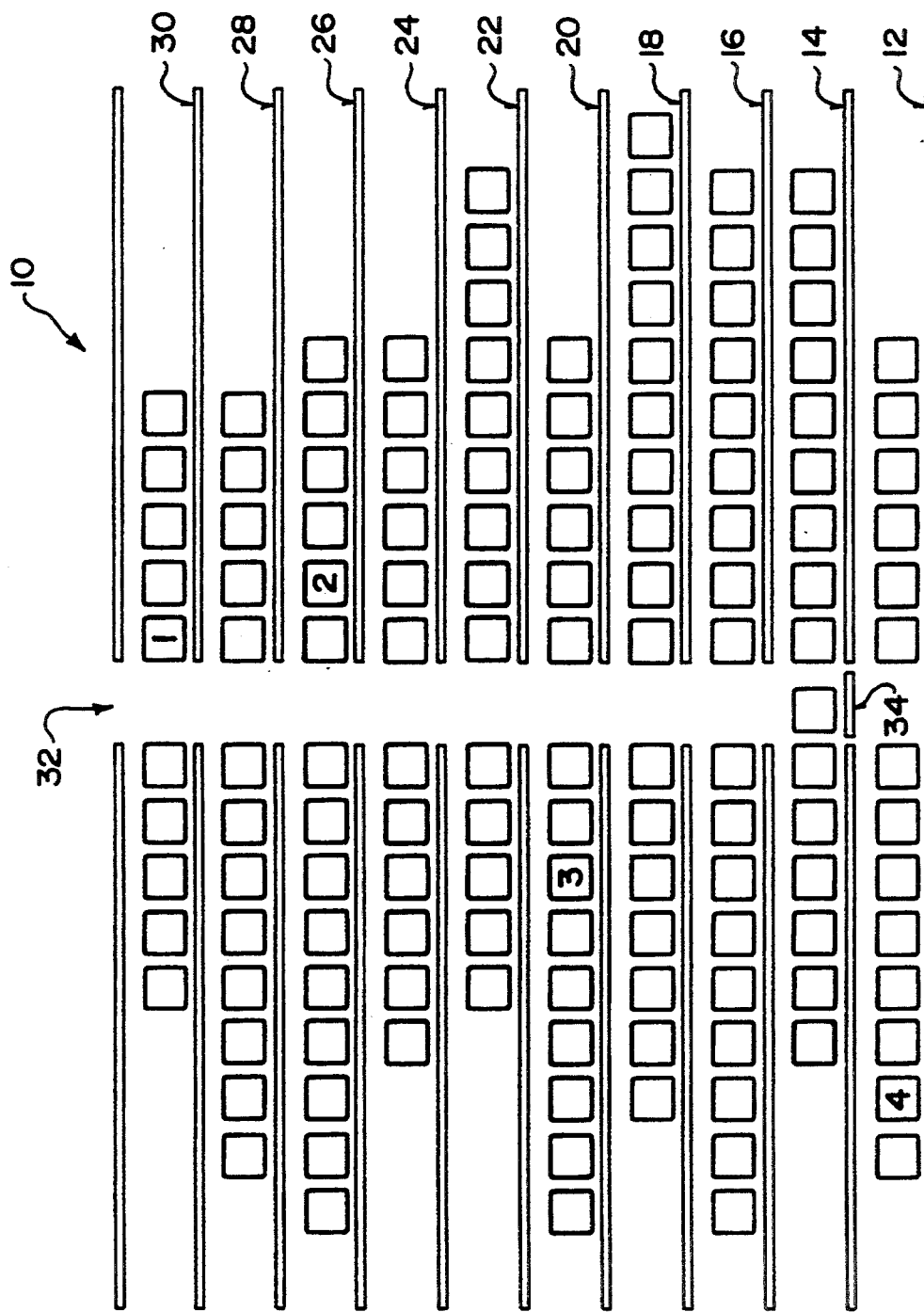

When the static container has been lifted to level 14 by hoist 34, as depicted in FIG. 2, double laterally acting shuttle 36 displaces the container to the left, storing it on the left side of level 14. The static containers previously stored on the left side of level 14 are displaced one storage position away from aisle 32. The computer again updates its records to indicate that the containers previously stored on the left side of level 14 have moved one storage position away from aisle 32; and, that the static container withdrawn from level 12 has moved into the storage position on the left side of level 14 immediately adjacent aisle 32.

Figure 3:
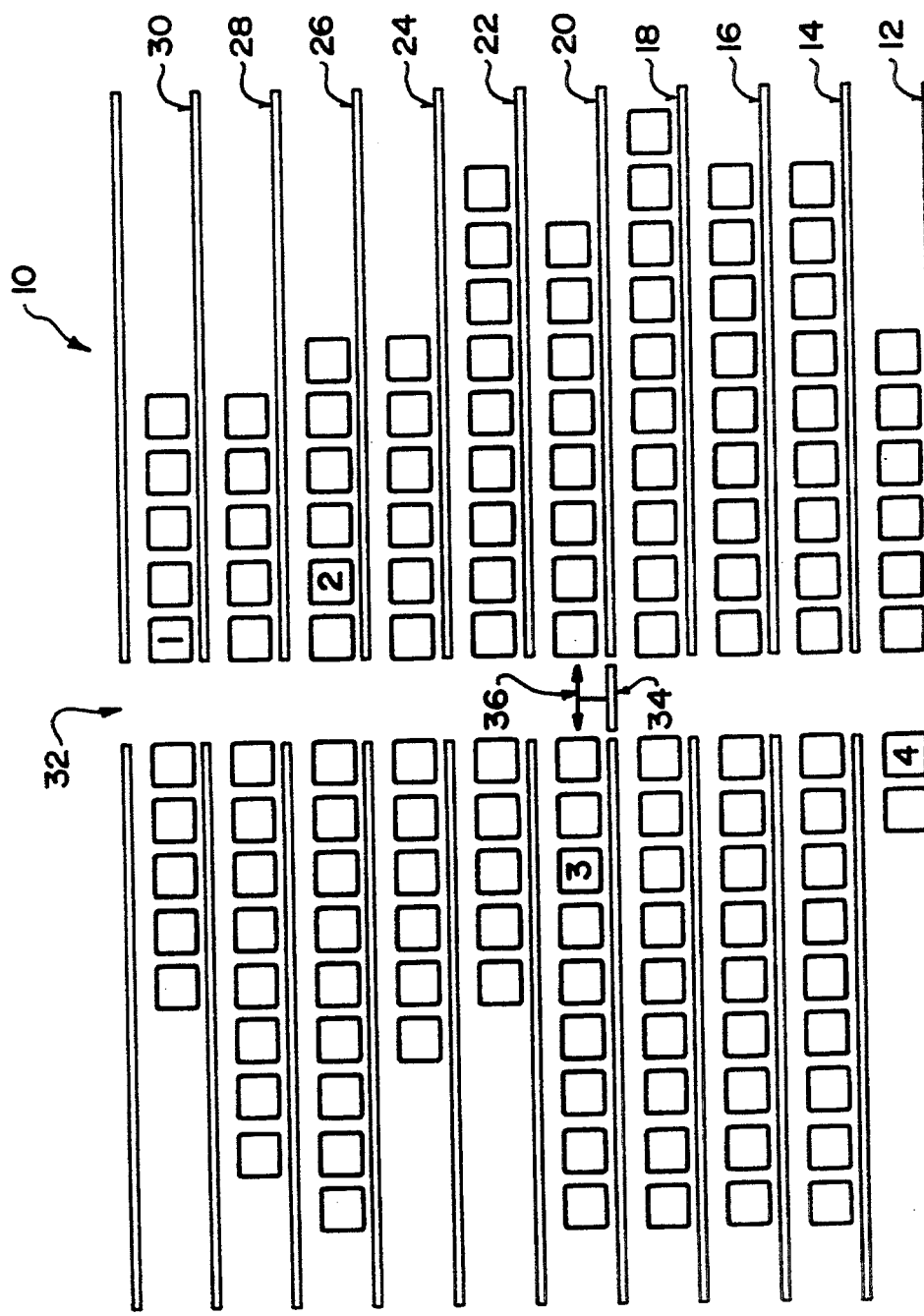

As may be seen by comparing FIGS. 1 and 3, the remaining six static containers behind which container 4 is buried are similarly sequentially shuffled from the left side of level 12 into other static storage positions on the left side of level 14, the left side of level 18 and the right side of level 20 to bring container 4 into position immediately adjacent aisle 32 on the left side of level 12, as shown in FIG. 3. As each container is withdrawn from or inserted into a storage position, the computer updates its records to reflect the new position of that container and all other containers displaced therewith.

Figure 4:
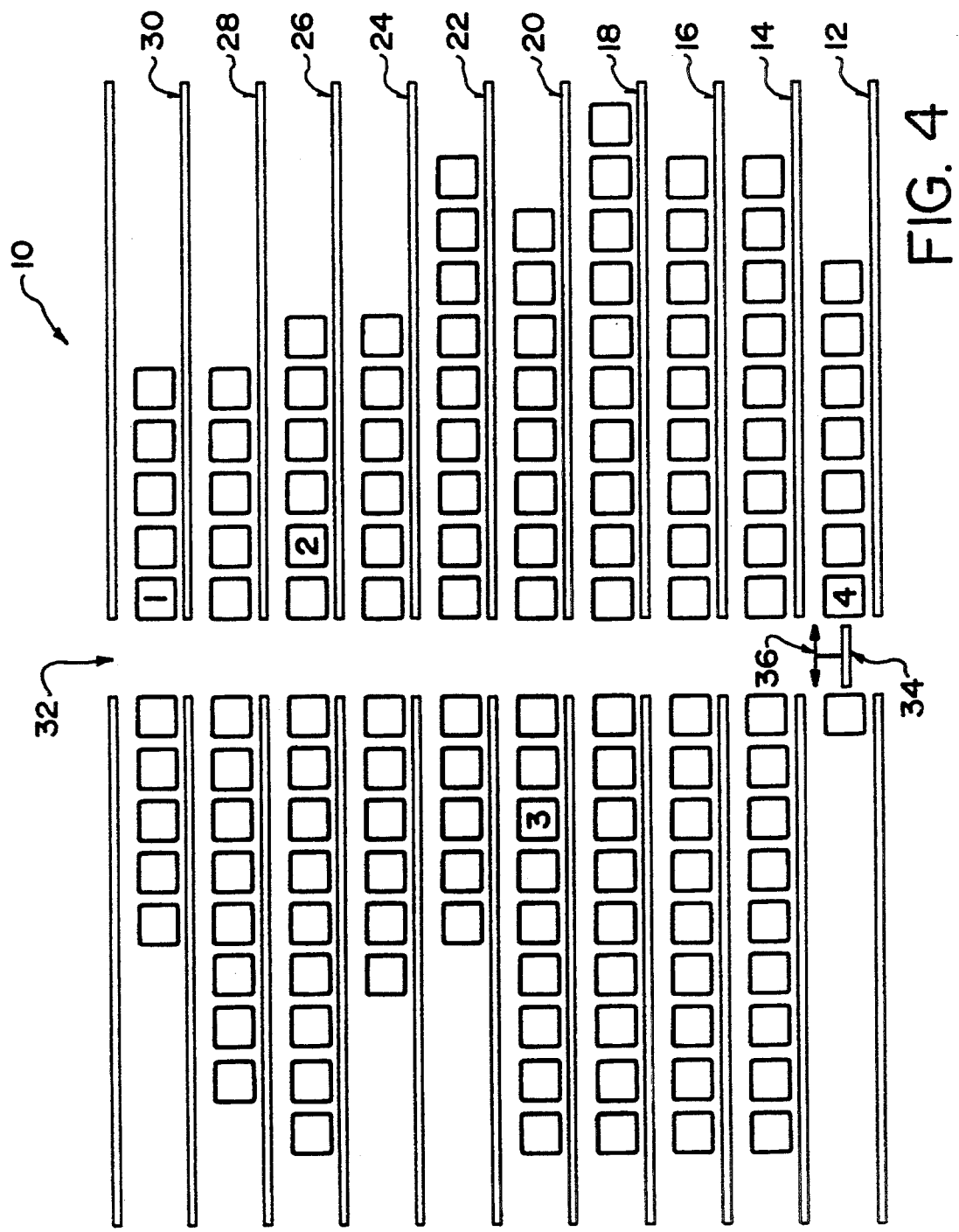

Comparing FIGS. 3 and 4, it can be seen that container 4 is transferred onto hoist 34 from its position adjacent aisle 32 on the left side of level 12 and then immediately transferred from elevator 34 into the position adjacent aisle 32 on the right side of level 12. Container 4 is thus stored within the previously defined grouping area.

Container 3 is buried on level 20, on the left side of aisle 32, behind two static containers which are to remain in storage. The two static containers must be shuffled into other storage positions in rack 10 in order to bring container 3 adjacent aisle 32 so that it may be transferred to the grouping area. As may be seen by comparing FIGS. 4 and 5, the two static containers behind which container 3 is buried are sequentially shuffled from the left side of level 20 into other static storage positions on the right side of level 20 and the left side of level 22, to bring container 3 into position immediately adjacent aisle 32 on the left side of level 20. As each container is withdrawn from or inserted into a storage position, the computer updates its records to reflect the new position of that container and all other containers displaced therewith.

Figure 5:
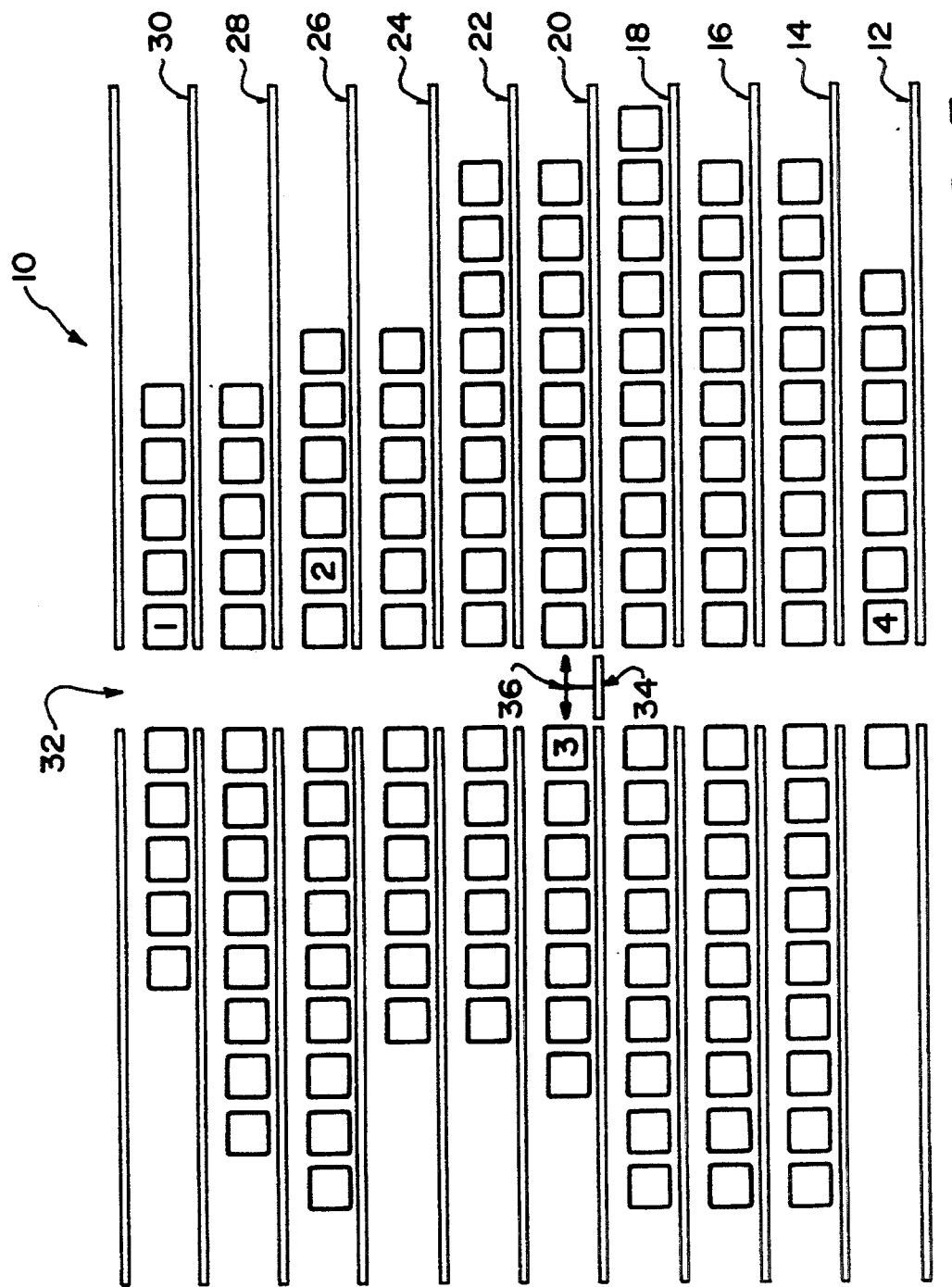
Figure 6:
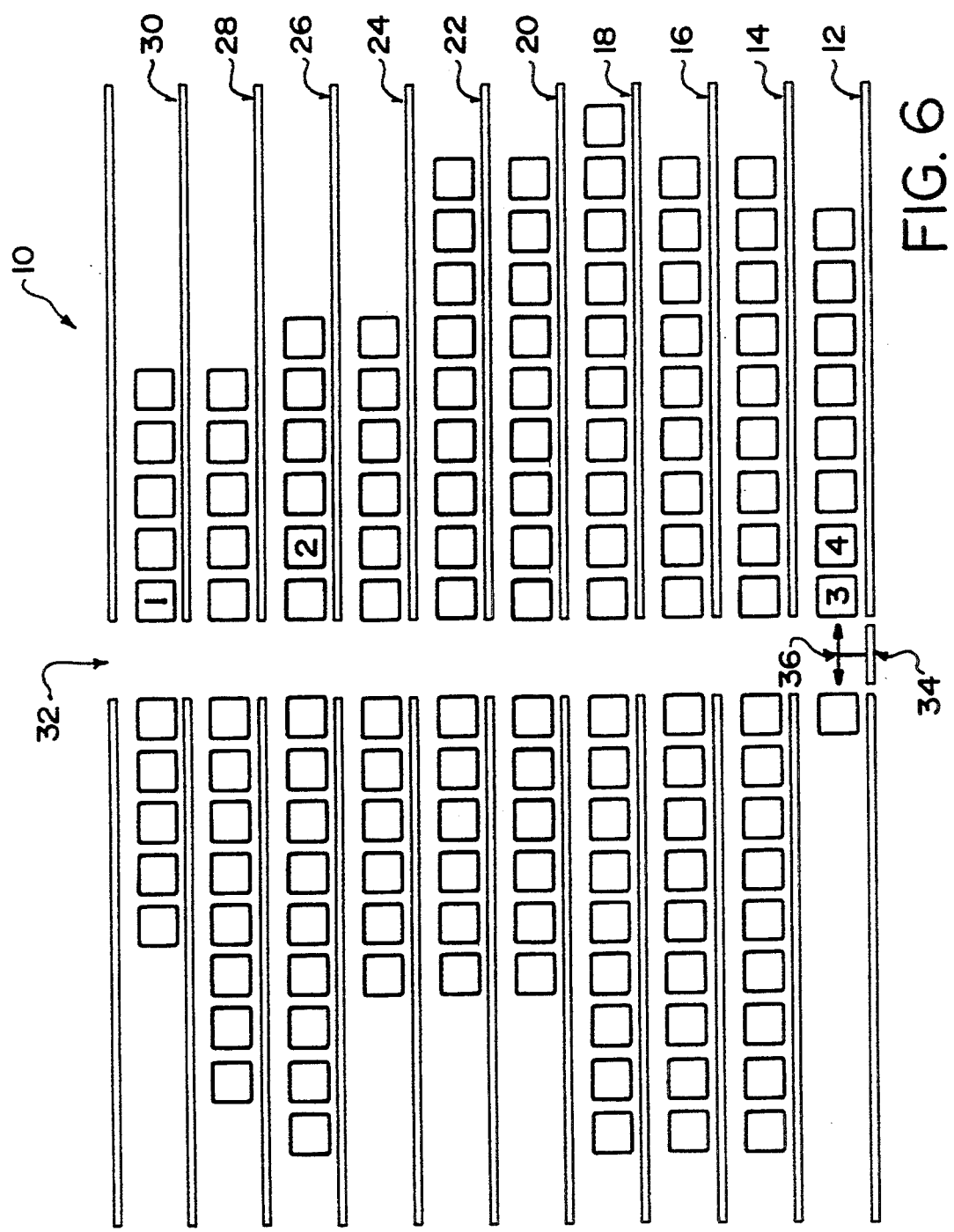

As may be seen by comparing FIGS. 5 and 6, container 3 is transferred onto hoist 34 from its position adjacent aisle 32 on the left side of level 20, lowered to level 12, and then transferred from elevator 34 into the position adjacent aisle 32 on the right side of level 12, displacing container 4 and the other static containers on the right side of level 12 one storage position away from aisle 32. Containers 3 and 4 are thus stored within the grouping area.

Container 2 is buried on level 26, on the left side of aisle 32, behind one static container which is to remain in storage. That static container must be shuffled into another storage position in rack 10 in order to bring container 2 adjacent aisle 32 so that it may be transferred to the grouping area. As may be seen by comparing FIGS. 6 and 7, the static container behind which container 2 is buried is shuffled from the right side of level 26 into another static storage position on the left side of level 24, to bring container 3 into position immediately adjacent aisle 32 on the right side of level 26. The computer again updates its records to reflect the new position of each shuffled container and all other containers displaced therewith.

Figure 7:
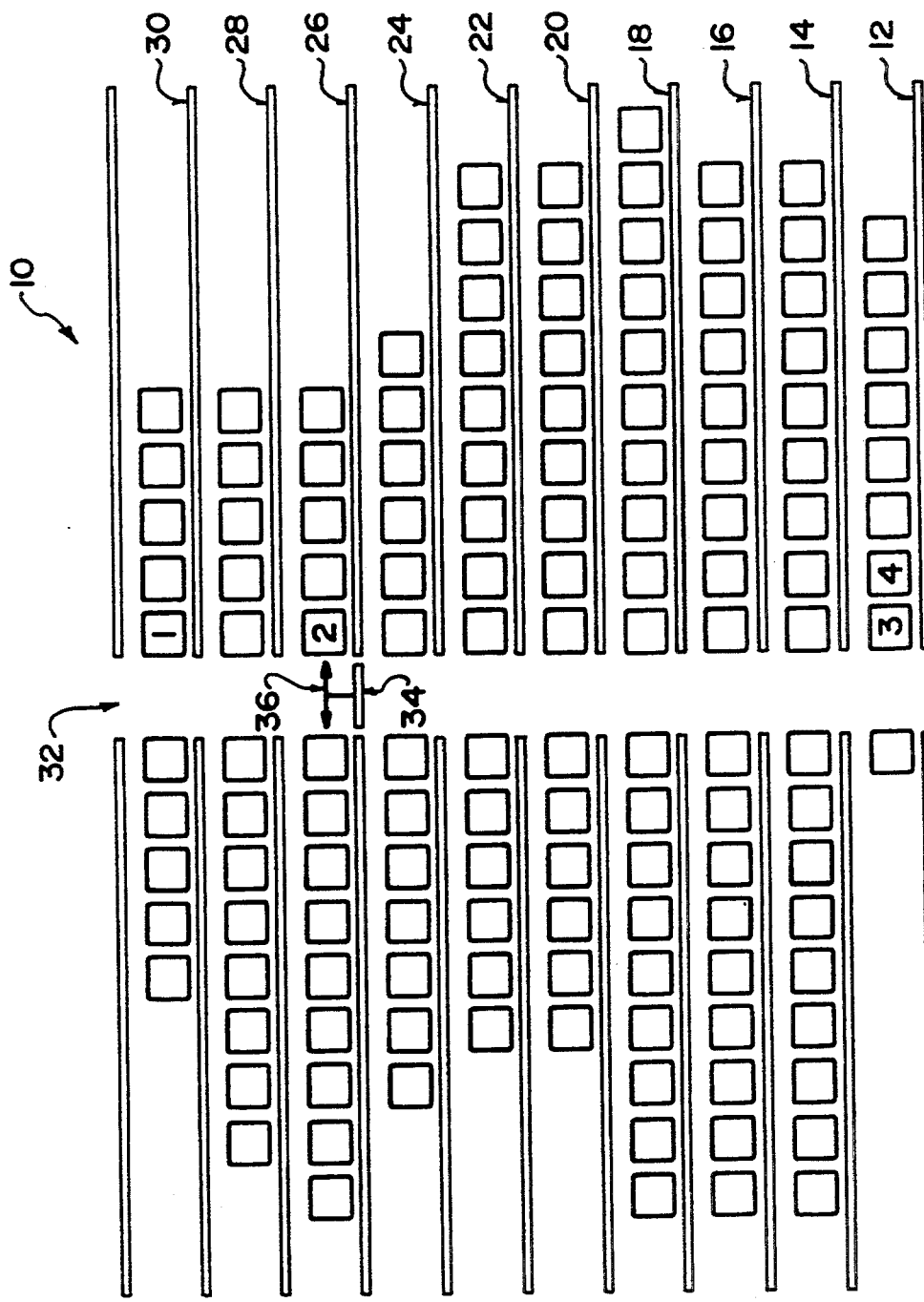
Figure 8:
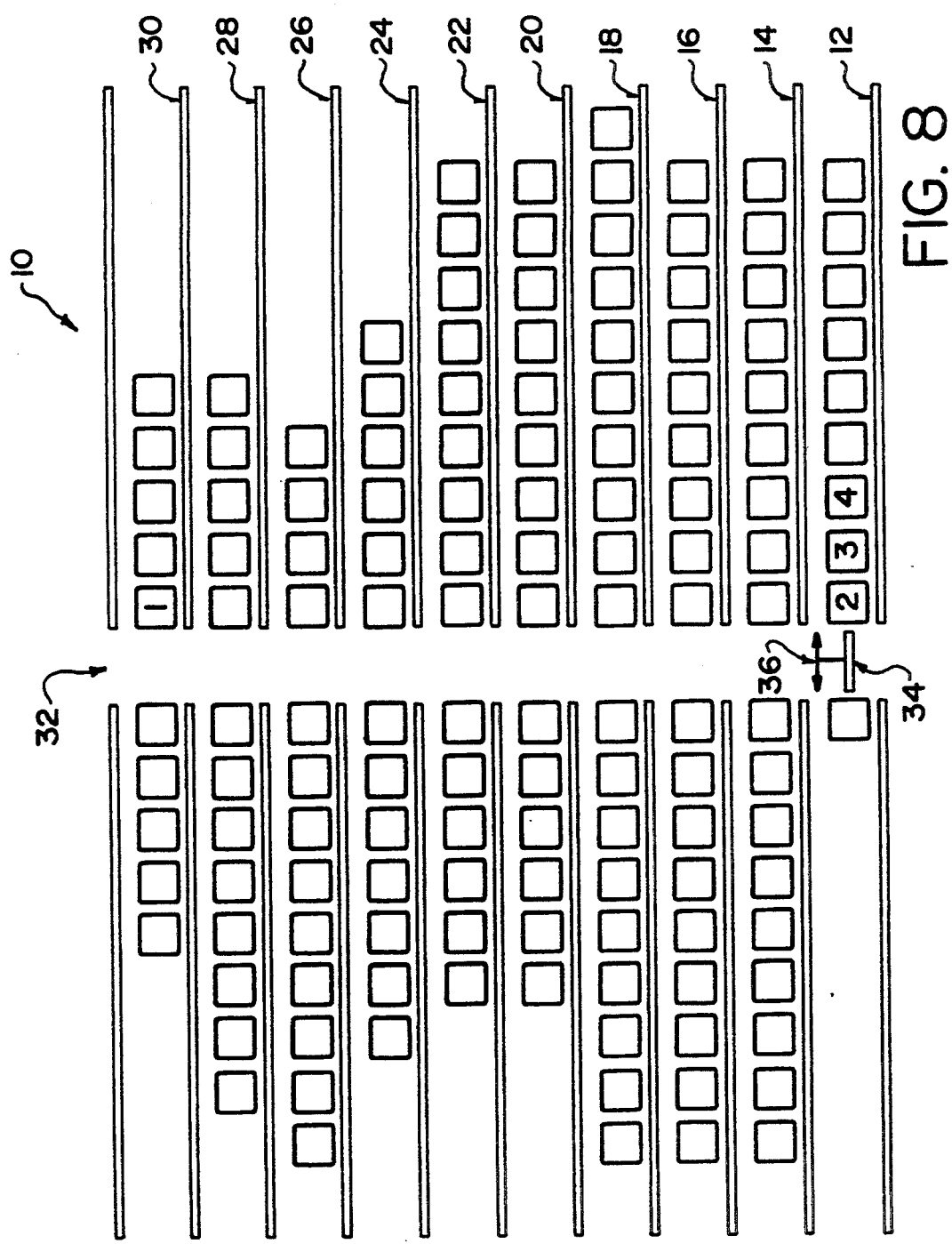
Figure 9:
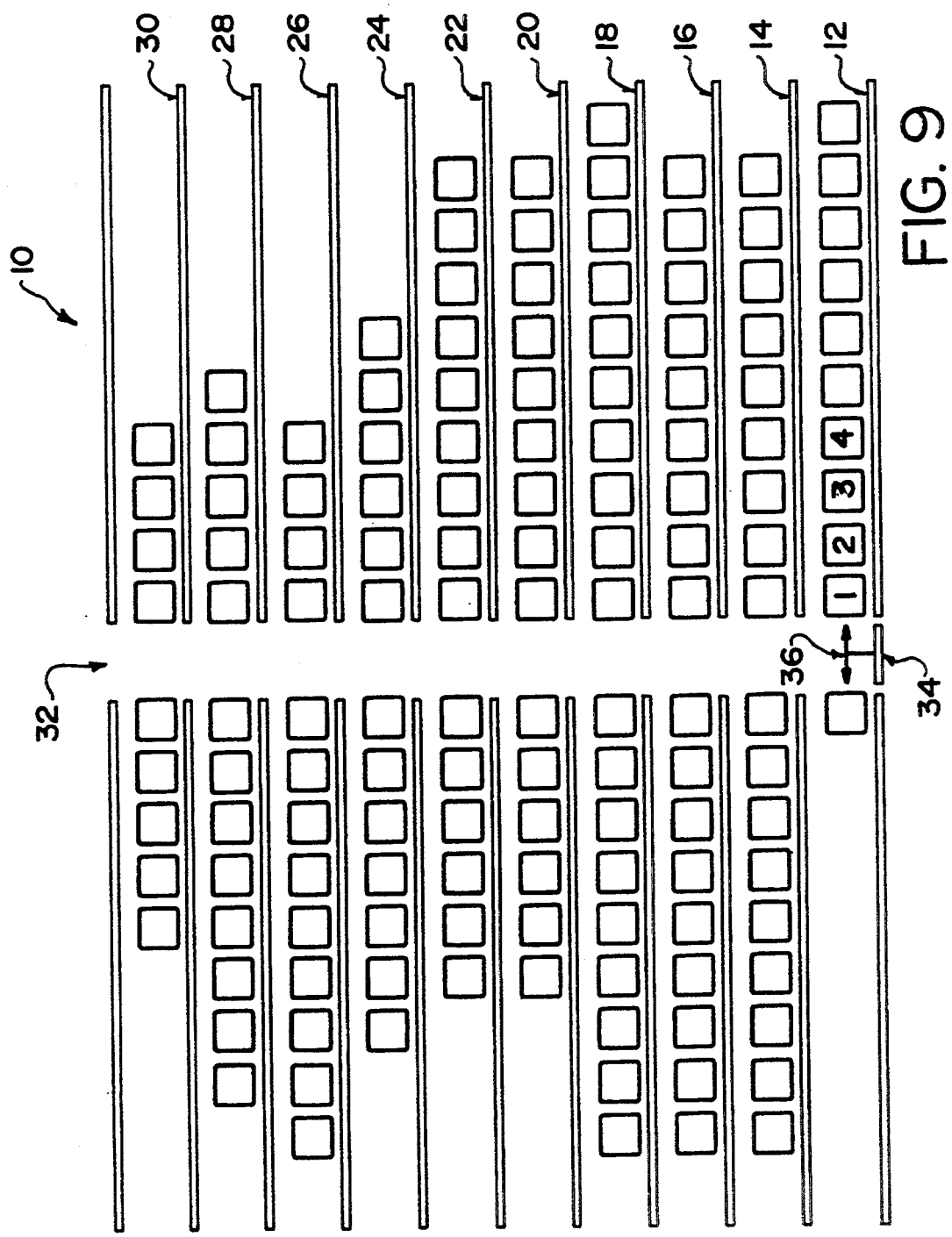

Comparing FIGS. 7 and 8, container 2 is transferred onto hoist 34 from its position adjacent aisle 32 on the right side of level 26, lowered to level 12, and then transferred from elevator 34 into the position adjacent aisle 32 on the right side of level 12, displacing containers 3 and 4 and the other static containers on the right side of level 12 one storage position away from aisle 32. Containers 2, 3 and 4 are thus stored within the grouping area.

Container 1 is not buried, but is already adjacent aisle 32 so it may be directly transferred to the grouping area without first shuffling any static containers. As may be seen by comparing FIGS. 8 and 9, container 1 is transferred onto elevator 34 from its position adjacent aisle 32 on the right side of level 30, lowered to level 12, and then transferred from elevator 34 into the position adjacent aisle 32 on the right side of level 12, displacing containers 2, 3 and 4 and the other static containers on the right side of level 12 one storage position away from aisle 32. Containers 1, 2, 3 and 4 are thus stored within aisle 32. The computer again updates its records to reflect the new position of each transferred container and all other containers displaced therewith.

When the container ship (not shown) is ready to receive the outbound containers, four conventional container carrying vehicles (not shown) are driven to rack 10. Aisle 32, hoist 34 and double acting shuttle 36 are constructed to allow the container carrying vehicles to pass through aisle 32 and to allow double acting shuttle 36 to transfer containers from rack 10 to the container carrying vehicles.

The first container carrying vehicle is driven into one end of aisle 32 and stopped adjacent container 1. Double acting shuttle 36 transfers container 1 from the grouping area to the first container carrying vehicle, which is then driven out through the opposite end of aisle 32 to the ship, rail car, or elsewhere, as depicted graphically in FIG. 10. The computer then updates its records to reflect the fact that container 1 is no longer in storage, and to reflect the new storage positions of containers 2, 3 and 4 and the other static containers stored on the right side of level 12, all of which are slidably displaced one storage position toward aisle 32 as container 1 is transferred to the first container carrying vehicle.

Figure 10:
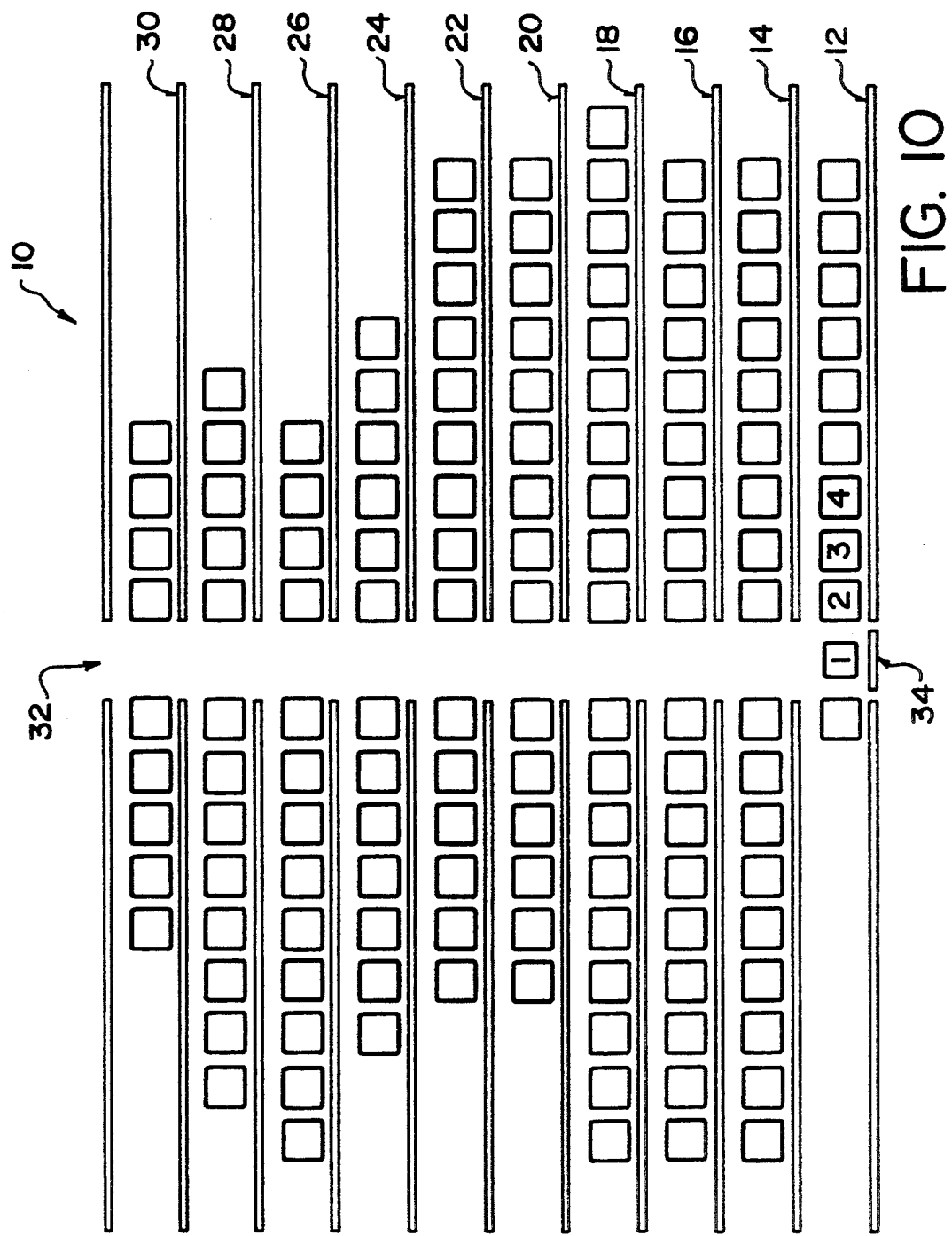
Figure 11:
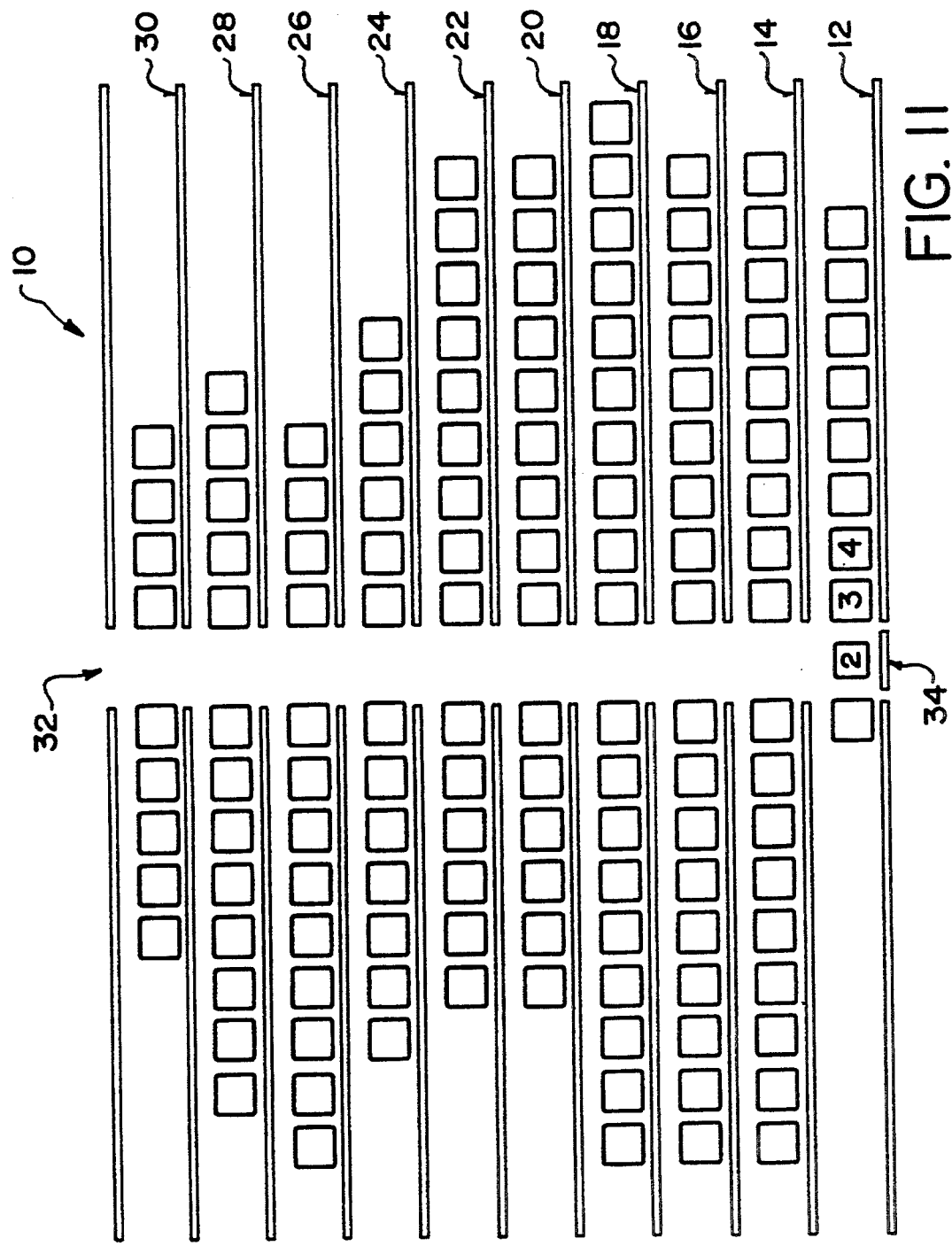

As the first container carrying vehicle exits aisle 32 with container 1, the second container carrying vehicle is driven into aisle 32 and stopped adjacent container 2, which is now adjacent aisle 32, as may be seen in FIG. 10. Double acting shuttle 36 transfers container 2 from the grouping area to the second container carrying vehicle, which is then driven out through the opposite end of aisle 32 to the ship, as depicted graphically in FIG. 11. The computer again updates its records to reflect the fact that container 2 is no longer in storage, and to reflect the new storage positions of containers 3 and 4 and the other static containers stored on the right side of level 12, all of which are slidably displaced one storage position toward aisle 32 as container 2 is transferred to the second container carrying vehicle.

Figure 12:
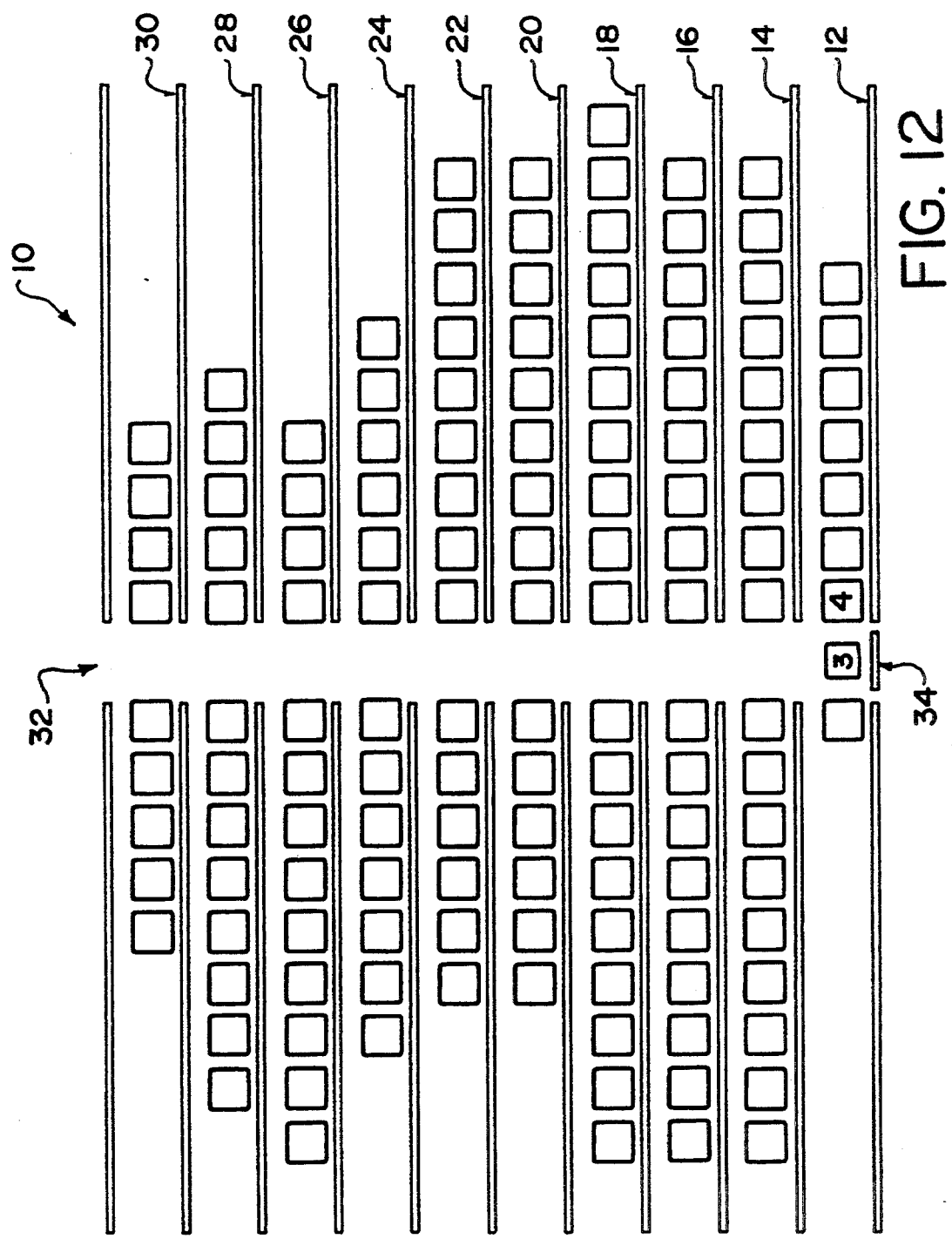
Figure 13:
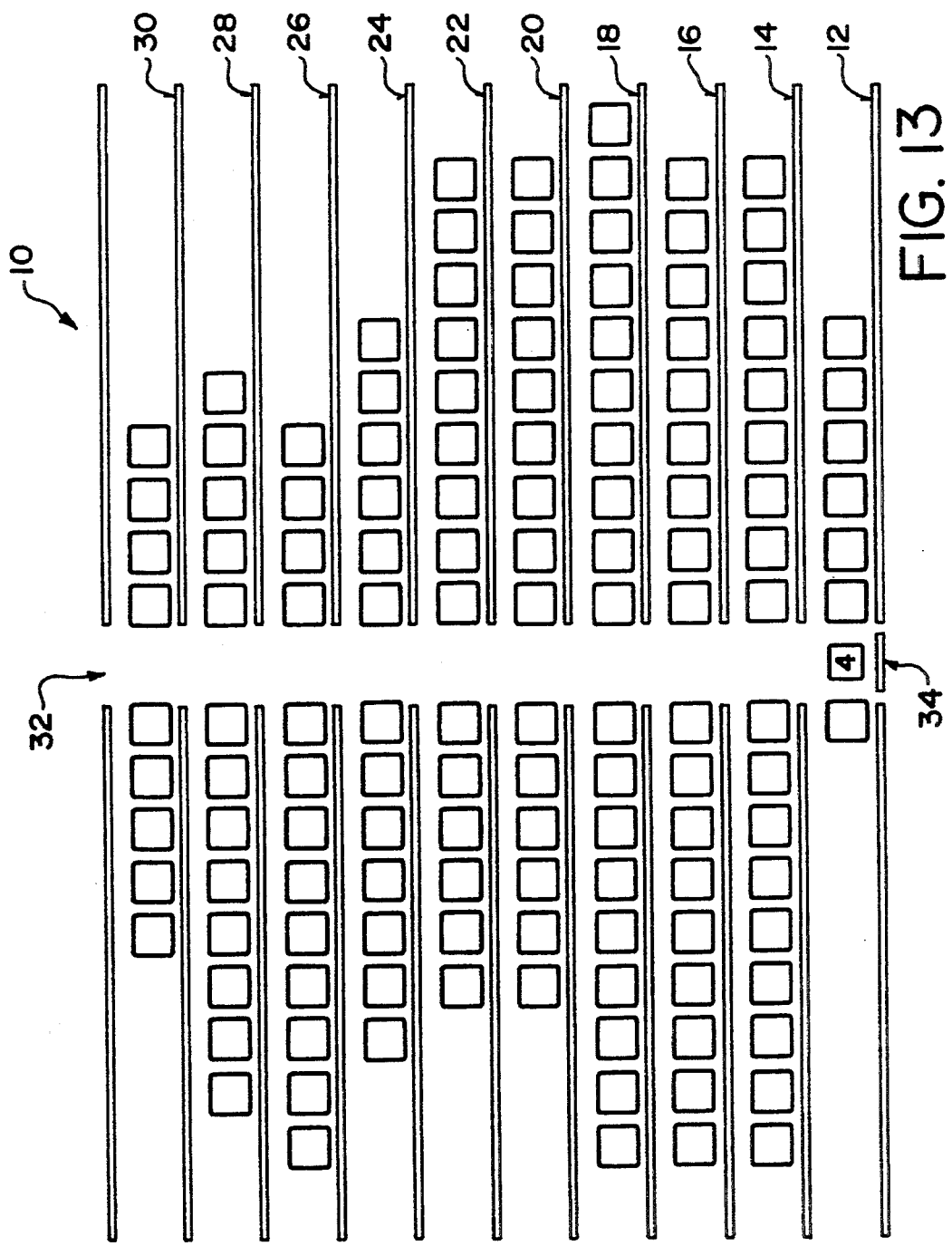
Figure 14:
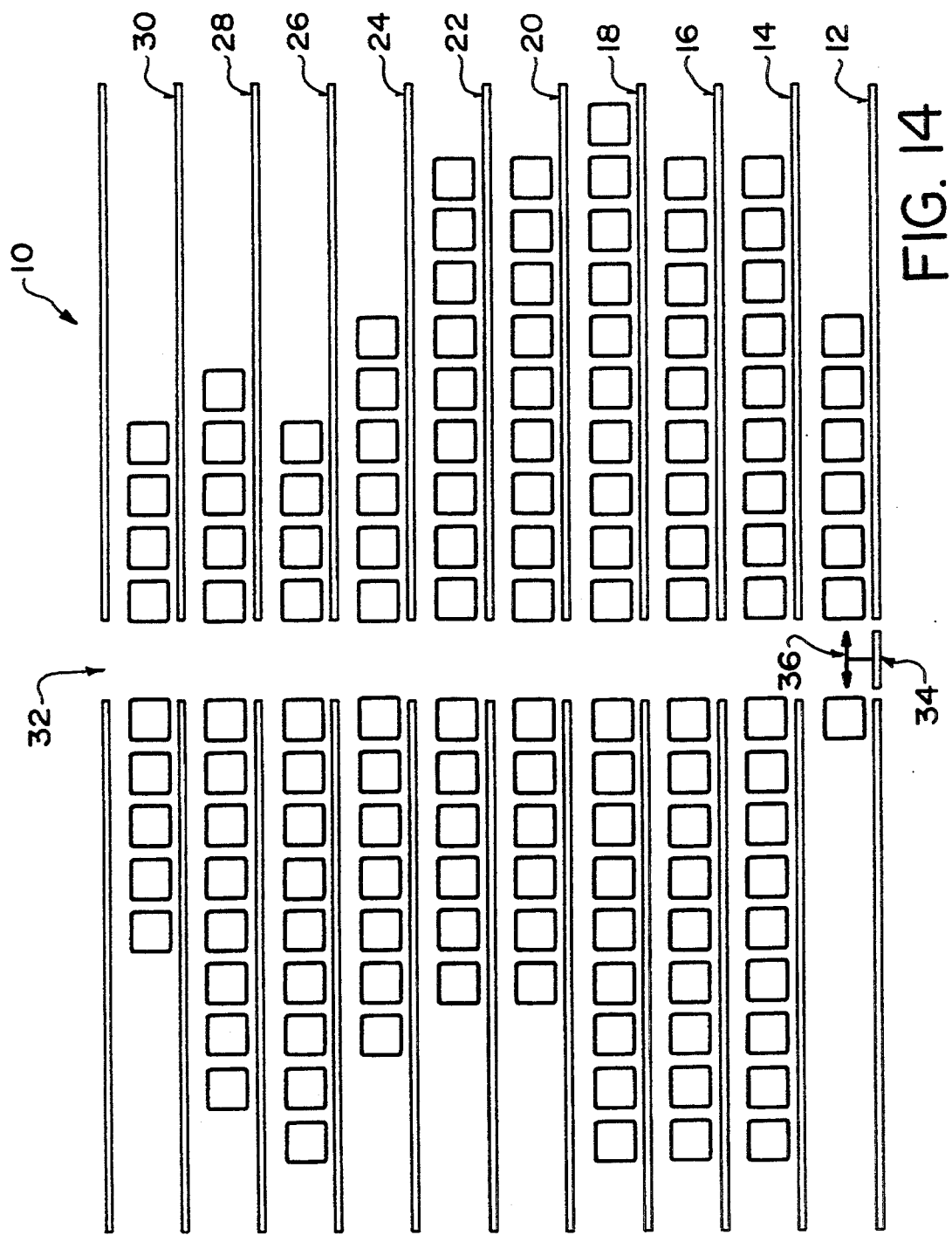

As graphically depicted in FIGS. 12 and 13, containers 3 and 4 are similarly sequentially transferred to the third and fourth container carrying vehicles respectively and driven to the ship. FIG. 14 depicts rack 10 after the four outbound containers have been removed, with the remaining static containers in storage. Roughly 5% of the container storage positions available within rack 10 should be left vacant at all times to ensure that containers may be shuffled with reasonable flexibility.

FIG. 15 graphically illustrates a portion of the operation generally described previously in association with FIGS. 7 and 8. It should be noted that FIG. 15 is included to clarify the transfers described above. It and this paragraph, describe a simplified "schematic" mechanism and not the actual system described in detail below. In particular, in FIG. 15, container 2 has been transferred onto hoist 34 and lowered to level 12. Double acting shuttle 36, which is gripping the corners of the container 2, is moved to the right (as seen in FIG. 15) to thereby transfer container 2 from hoist 34 into a position adjacent aisle 32 on the right side of level 12. FIG. 15 shows an alternative embodiment in which the spaced storage positions take the form of container corner supports (referred to as saddles 64 in FIG. 16 and subsequent Figures including FIG. 36) connected at spaced intervals to opposite sides of a pair of endless loop chains (only one chain is visible in the side elevation depiction of FIG. 15).

Other mechanisms are possible. For instance, the saddles 64 may be stacked or stored in a magazine, and taken in series as required to support the bottom corners of the container or stored as required in the magazine, as containers are removed from the level. The saddles are spaced according to the lateral dimensions of the container. The containers 3 and 4 and the saddles 64 can themselves form a spaced linked chain. The saddles keep the containers 3 and 4 from abutting one another, which can damage the container.

As container 2 is displaced off elevator 34, its lower right edge comes into contact with the left angle shaped corner support (saddle 64) atop the chains and adjacent aisle 32 (only one such corner support is visible in FIG. 15). Continued lateral movement of double acting shuttle 36 displaces the spaced saddles 64 to the right as viewed in FIG. 15, thereby displacing containers 3 and 4 and the other static containers on the right side of level 12 to the right. Such displacement continues until container 2 is fully displaced into the storage position adjacent aisle 32, at which point the right angle shaped saddle 64 (initially located on the underside of the chains) have been carried into position on the upper side of the chains to capture and connect with the lower left edge of container 2. It is important to note that the system does not simply push (slide) containers by shunting one container with another (which can readily damage a 40 ton container), but that the endless chain system and spaced saddles 64 move the containers 2, 3 and 4 in unison. Not only does this prevent damage to the abutting containers, but it also requires less power due to friction forces to be overcome. Also, since the heavy containers, which are reinforced only at the ends, build up considerable momentum when moved, the saddles 64 hold them spatially aligned and firmly at the locations intended, ie. the reinforced corners. Containers should not be moved by attempting to pick them up in the middle—otherwise, they "banana", as known in the trade.

Specific Hoist-Shuttle-Spreader Assembly

FIG. 16 illustrates an isometric view of a prototype of the hoist-shuttle-spreader assembly, which is specifically adapted to carry out the method of the invention. The assembly is mounted in position over an aisleway, and adapted to capture and move cargo containers either upwardly or downwardly, or laterally as described previously.

The embodiments illustrated in FIGS. 16 through 43 represent a prototype which has been constructed to demonstrate the performance of the invention. The prototype has been manufactured to fit within a specific building in which it is housed. In practice, a number of non-inventive modifications would be made to the construction to suit specific applications.

As seen in FIG. 16, the container hoist-shuttle-spreader assembly 50 (which are identified as hoist 34 and shuttle 36 in FIG. 1 to 15) comprises a generally rectangular shaped hoist 52, a generally rectangular shaped shuttle 54, and a generally rectangular-shaped spreader 56, one positioned under the other. These components are independently movable relative to one another and cooperate to grab and move a container in any one of four directions (upwardly or downwardly or laterally to either side) as required. The assembly 50 moves upwardly or downwardly as a unit on four rectangularly disposed vertical guide rails 58. The hoist 52 (which is an elevator) raises or lowers the container from one tier to the next, and at the same time carries the shuttle 54 and the spreader 56, and a container, if the spreader 56 is holding one.

The respective movements and positions of the hoist 52, shuttle 54, and spreader 56 are powered by hydraulic cylinders 128, 129 and 177 (shown in somewhat stylized form) and controlled by computer 500. The system is described in greater detail below in connection with specific drawings.

The shuttle 54 moves one container laterally to the left or the right (as seen in FIG. 16) and is mounted under the hoist 52 frame. The shuttle 54 carries the spreader 56.

The spreader 56 engages fittings located on the top four corners of the container 1 and is typically capable of raising and lowering from the shuttle 54 to a distance of about 4 feet (in the prototype). In an alternative embodiment, the shuttle 54 and spreader 56 could be combined since they serve the common purpose of moving the container laterally. However, having a separate shuttle 54 and spreader 56 provides greater flexibility and enables the system to deal with containers that are not accurately aligned on trucks in the aisle. The shuttle 54 and spreader 56 move the container 1 laterally and are adapted to prevent shifting out of alignment of the container due to momentary forces built up by the 40 ton container when it is moved. Four containers, a first container 1, a second container 2, and third container 3 and a fourth container 4 are depicted in FIG. 16. Containers 1 and 2 ride on the saddles 64 of the left carrier tracks 62. Containers 3 and 4 ride on the saddles 64 of the right carrier tracks 62. The containers are held upon specifically designed saddles 64 on the carrier tracks 62. The saddles hold the containers a certain distance from each other and thus prevent the containers colliding or damaging one another when they are moved. Carrier (tracks) 62 on either side of the aisle represent shelves or tiers as illustrated in FIGS. 1 to 15.

FIG. 16 also illustrates horizontal guide rails 60, which are mounted in parallel and upwardly from carrier (tracks) 62. The four. horizontal guide rails 60 permit the shuttle 54 and spreader 56 to move laterally when the hoist 52 moves to an elevation where the rails 60 are in proper elevational alignment. The shuttle 54 and spreader 56 can move left or right on rails 60 in order to enable container 2 or 3 to be captured, as the case may be.

As shown in FIG. 16, the spreader 56 and the shuttle 54 can reach containers 2 and 3. In order to off-load container 4, for example, then container 3 must be moved across the aisleway onto the left side carrier tracks 62 assembly, beside container 2. When the containers 1, 2, 3 or 4 are placed on the saddles 64 of the carrier tracks 62, they are effectively held in specific orientation by properly spaced saddles 64, and in effect form an endless chain comprising the saddles 64 and the bases of the containers linked together.

Figure 17:
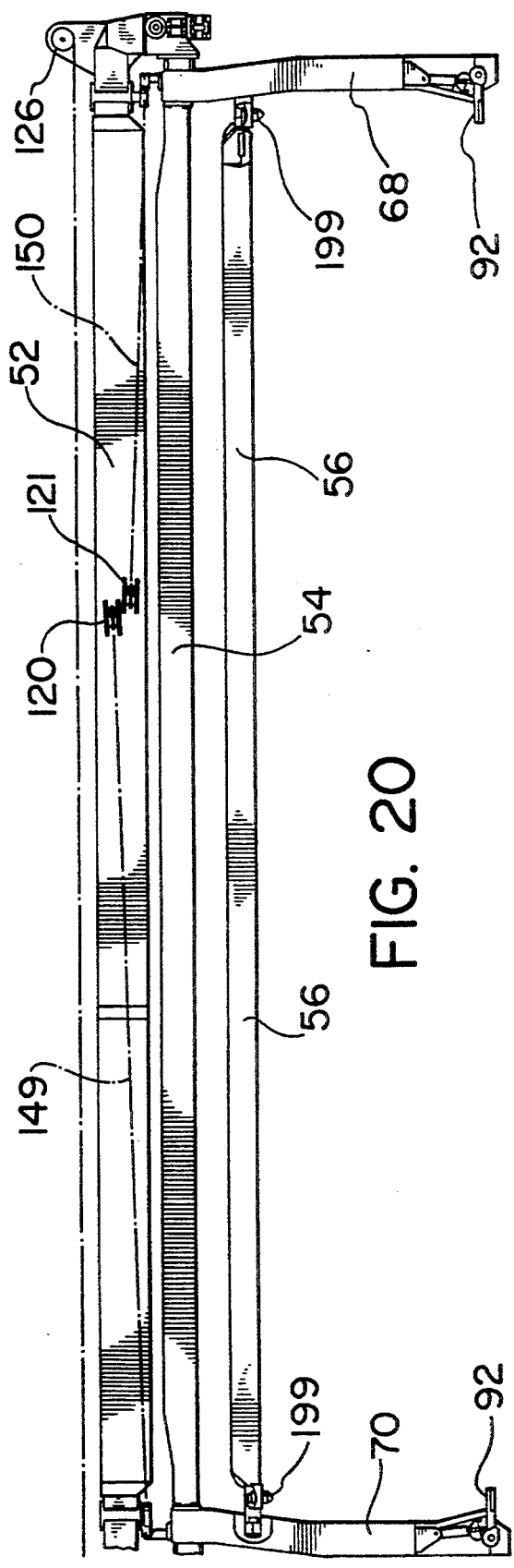
FIG. 17 illustrates a stylized side view of a container spreader-shuttle-hoist assembly, the spreader raising and lowering a container in the shuttle-hoist assembly.

FIG. 17 illustrates a side view of a spreader 56, which is positioned under shuttle 54, which in turn is positioned under hoist 52. Spreader 56 allows fine adjustment in container movement by raising and lowering container 1 in the shuttle 54, hoist 52 assembly as indicated by the arrows. Spreader 56 can move upwardly or downwardly independently of hoist 52 and shuttle 54. Spreader 56 can also twist horizontally to a certain extent to enable it to grab containers on trucks which are not completely aligned in the aisleway.

Figure 18:
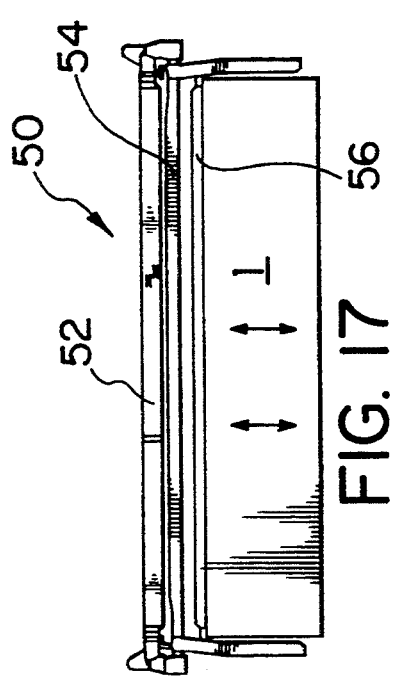
FIG. 18, illustrates a side view of a hoist-shuttle combination, the hoist raising and lowering a shuttle-spreader assembly in an aisle between tiers.

FIG. 18 illustrates a side view of the hoist 52, which raises and lowers shuttle 54, and spreader 56 (not visible) in the aisle between adjacent storage tiers. The spreader 56, shuttle 54 and hoist 52 move upwardly and downwardly together.

Figure 19:
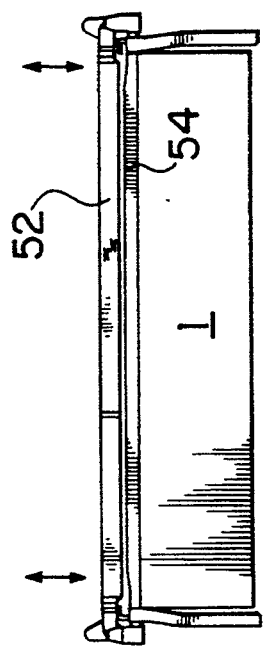
FIG. 19 illustrates an end view of a shuttle which moves horizontally a spreader-container assembly.

FIG. 19 illustrates an end view of hoist 52, shuttle 54, and spreader 56, and by directional arrows the horizontal lateral movement of shuttle 54, spreader 56 and container 1. This lateral movement is used in order to move a container 1 laterally onto either the left or right carrier tracks 62, as seen in FIG. 16.

Figure 20:
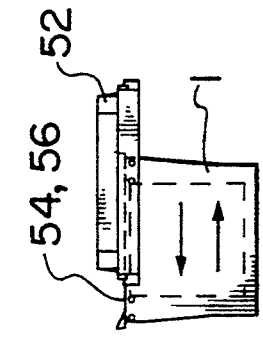
FIG. 20 illustrates an enlarged side view of a hoist-shuttle-spreader assembly.

FIG. 20 illustrates a detailed side view of the hoist 52, shuttle 54, spreader 56 assembly. The shuttle 54 has at each end vertical end structures 68 and 70 which extend downwardly outside the four vertical ends of a container (not shown). The ends 68 and 70 enable the lower standard corner fittings of a container to be gripped by the four paddle assemblies 92 (only two are visible in FIG. 20), as will be explained in more detail below. The spreader 56 is equipped at its four corner ends with four twist locks 199 which are also adapted to engage the top corner fittings of a standard container. Sprocket assembly 126 is also shown at one end of the hoist 52. Hoist 52, shuttle 54 and spreader 56 are moved relative to one another and independently by a system of sprockets and chains which are more clearly illustrated in FIGS. 23, 24, 26 and 27, and discussed below in more detail. The pulley lines 149 and 150 and pulleys 120 and 121, shown on the side of hoist 52 connect with pulleys on the shuttle 54 and are used to laterally move the shuttle 54, and spreader 56, to either side as explained below in association with FIG. 25.

FIG. 21 illustrates a detailed top view of the shuttle 54 assembly. The rectangular construction of the shuttle 54 assembly, evident in FIG. 21, is slightly larger in size than a standard container. FIG. 22 illustrates a detailed side view of the shuttle 54 and the two downwardly extending end structures 68 and 70, with paddles 92.

As seen in FIGS. 21 and 22, the shuttle 54 is constructed with a pair of shuttle ends 68 and 70 which, due to their rigid construction, enclose the container at each end and enable the container which can weigh 40 tons to be moved laterally without undue racking forces due to momentum being imposed upon the container. Thus the integrity of the container is maintained. The shuttle end structures 68 and 70, as seen in FIG. 22, carry at the bottom end paddles 92 and the brake actuators (not shown) which engage the four bottom corner fittings of a standard container. The paddles 92 rotate upwardly and downwardly in order to disengage or engage the lower corner fittings. The four roller assemblies 73, which enable the shuttle 54 to roll laterally on the guide rails 60, are illustrated in FIG. 21 at the corners of end structures 68 and 70. There are eight roller assemblies 73 on the shuttle, two at each corner. These roller assemblies 73 are adapted to roll in horizontal guide rails 60 (FIG. 16) and hoist shuttle channel 139 (FIG. 24). The shuttle 54 has a pair of shuttle cross beams 74 extending between the ends 68 and 70. At each of the four top corners of the end structures 68 and 70, there is mounted respective anchor bracket 75, bolt 76, washer 77 and hex nut 78 combination 79. These combinations 79 enable the shuttle 54 to be connected to the hoist 52 (see FIG. 20) by means of respective chain anchor pins 80 and cotter pins 81. Adjusting bolts and nuts 93 and 94 which permit adjustment of the relationship of the shuttle 54 and the hoist 52 are visible below chain anchor pin 80 in FIG. 22. In top view in FIG. 21, at the lower right, the components of the roller assembly 73, namely, thrust roller assembly 98, with hex bolt 99, hex nut 100 and washer 101, is shown.

FIG. 22 also illustrates, at the respective bottoms of the end structures 68 and 70, the paddle/flipper assemblies 71. When a container is supported by the spreader 56 (FIG. 20) and is to be transferred laterally by the shuttle 54, the paddles 92 swing down at each corner to a position immediately beside the bottom corner castings of the container to prevent any lateral movement relative to the shuttle 54 and, by an interlocking mechanism, the paddles 92 may swing out to engage the holes in the end surface of the standard bottom corner castings of a conventional container. Also by an interlocking mechanism, the brake actuating shoes (see FIG. 29) are lowered to the engagement position.

FIG. 23 illustrates a top view and FIG. 24 a side view of a hoist assembly 52 in the configuration used in the prototype. As with the shuttle 54 and spreader 52, the hoist has a rectangular configuration and is somewhat larger in dimension than the horizontal dimensions of a standard container. Hydraulic cylinders 128 and 129, which extend in and out and are activated by a motor (shown in FIG. 23) and valves, are connected to sprocket assemblies 126, 127, 160 and 161 and roller chains 149, 150, 151 and 152 are used to connect together and move the hoist and shuttle assemblies. The control of the movement can be done manually or by computer. This configuration relating to the prototype will be described in detail below.

In the configuration depicted top view in FIG. 23 and side view in FIG. 24, the shuttle hydraulic cylinders 128 and 129 are situated on the centerline of the main hoist assembly with the hoist cylinder 128 mounted just above the shuttle cylinder 129. The hoist cylinder 128 rod carries a yoke 157 to which four separate lengths of roller chain 152, the inner ends of which are attached by means of adjustable anchor pin assemblies 156. The four separate roller chains 152 are taken respectively toward each corner of the hoist 52 assembly in right angle arrangements by means of the sprocket assemblies 126 contained within the laterally extending guide assemblies 122. The guide assemblies 122 are bolted one to either side of the hoist cylinder 128 and to the two parallel hoist assembly side beams 119.

Each of the four roller chains 152 is securely attached at its outer end to a hoist chain 151 by a 90 degree fitting 155. The intermediate portion of each hoist chain is taken through a sprocket assembly 127 mounted between vertical lugs at each of the four corners of the hoist assembly (shown at each end of FIG. 24) and then vertically upwards to respective hoist anchors (not shown) at the respective tops of the four hoist guide rails 58 (FIG. 16). In this way, by movement of the hoist hydraulic cylinders 128, the hoist 52, and the shuttle 54 and spreader 56, can be raised or lowered.

At each corner of the hoist assembly there is mounted a hoist latch assembly 141, 159 (see FIG. 24) by means of which the hoist unit may be positively locked into the hoist guide structure (not shown) at any tier. The construction of these hoist latch assemblies 141, 159 will be described in more detail below.

The shuttle cylinder 129, which is directly under the hoist cylinder 128, has a double ended piston rod which carries respective double sprocket assemblies 160,161 on each end. On the near side of the shuttle cylinder 129 as shown in FIG. 24 there is a bracket 111 at the left hand end and a double sprocket assembly 112,113 at the right hand end. The bracket 111 and the double sprocket assembly 112,113 are duplicated (but not shown) on the far side of the shuttle cylinder 129 but these are at the opposite ends to those on the near side. In other words, when viewed from above, each end of the shuttle cylinder 129 carries a bracket 111 on one side and a double sprocket assembly 112,113 on the other. Describing one side only (the other is identical but reversed), one end of each of the shuttle chains 149 and 150 is attached, one above the other, to the bracket 111 by means of an adjustable chain anchor assembly 154,156. The shuttle respective chains 149 and 150 are then taken from the anchor assembly 154, 156 around the double sprocket assembly 160,161 on the respective ends of the shuttle cylinder piston rods 129 and thence around the double sprocket assembly 112,113 on the opposite side of the shuttle cylinder 129 and thence laterally outwards to pass through holes in the hoist assembly side beam 119. The shuttle chains 149 and 150 are each then taken around one or the other of the sprocket assemblies 120, 121 and then towards the two ends of the hoist assembly as shown in FIG. 24 with the upper chain 149 going to the farther (left) end of the hoist assembly and the lower chain 150 going to the nearer (right) end. The two chains 149 and 150 are then each taken around a respective one of the sprocket assemblies 125,128 and then to one of the respective shuttle chain anchors 79 (see FIGS. 21, 22). The two shuttle chains (not visible) at the other side of the shuttle cylinder 129 follow a route similar to that described above but are handed left to right and side to side. When the shuttle cylinder 129 is in its mid-position the shuttle assembly 54 is positioned in the centre of the hoist assembly 52. When the shuttle cylinder 129 is extended, then the shuttle 54 is laterally positioned to the left or right relative to the hoist 52.

Alternative configurations, as can be recognized by a skilled artisan, are possible (but not shown) in which one or both of the hydraulic cylinders may be replaced by one or more reversible hydraulic motors. Another alternative (which would be preferred for a multi-storey system) would have the hoist cylinder, sprockets and roller chain system replaced by a reversible winch or winches to operate the hoist mechanism by means of flexible steel wire cables. As an inexpensive alternative, the prototype has been successfully tested with four direct acting vertical cylinders placed one at each corner adjacent to the hoist guide rails. Whichever alternative is chosen for a particular system, the principle remains the same as in the following description of the working prototype.

It should be understood that the working prototype was constructed to thoroughly test the container acquisition and transfer mechanisms with full size loaded and unloaded I.S.O. freight containers, which can weigh 40 tons, and are typically forty feet in length, eight feet high and eight feet in width. The prototype was intended to work, and has been working, 24 hours per day—unattended—under the control and supervision of a programmed computer. The prototype has for safety and confidentiality reasons, and other reasons, been built and housed within a secure building. The difficulty of finding a large enough building, with sufficient headroom and clear span, resulted in the decision to power the hoist mechanism by means of hydraulic cylinders and roller chains rather than the preferred winch method. It will be appreciated that the actual means of simply raising and lowering the hoist assembly from one tier to another can be performed by any suitable conventional mechanism, as will be understood by a person skilled in the art.

The constraints of the available building resulted in the decision to build the prototype with two short tiers on the one side of the hoist and one long tier on the other, with which configuration all the functions of a multi-storey unit could be, and have been, tested.

Figure 25:
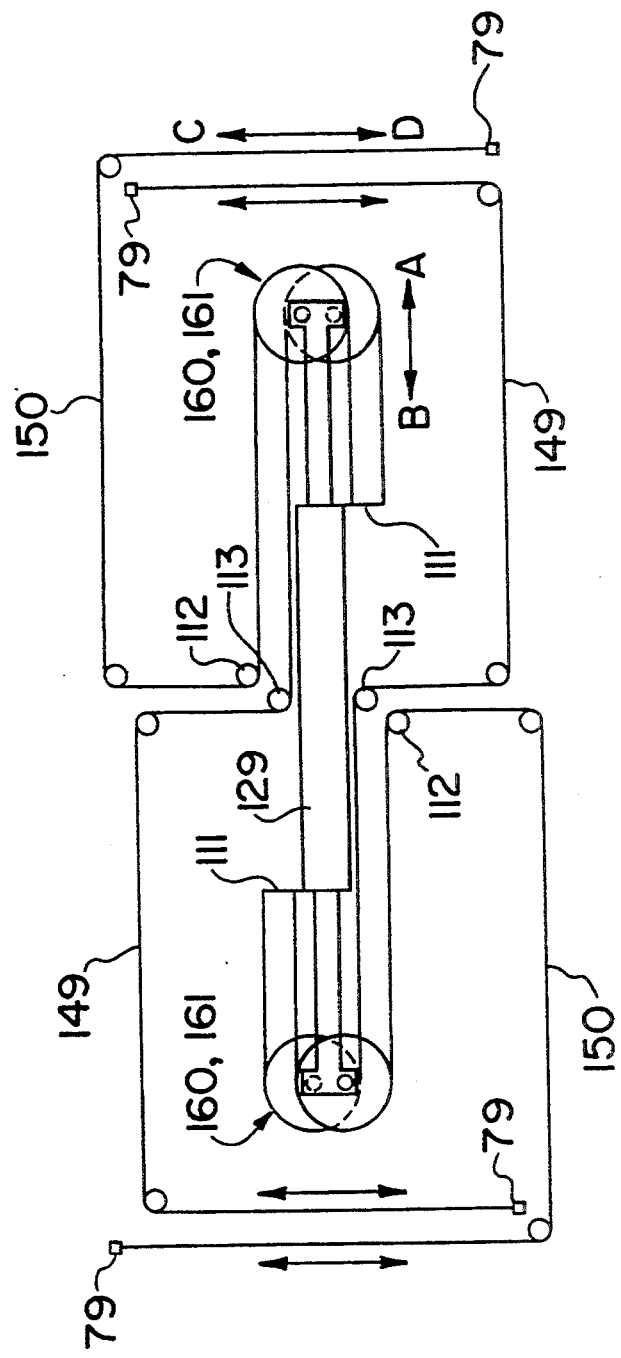
FIG. 25 illustrates a schematic top view of the shuttle chain drive in the cylinder powered configuration.

FIG. 25 shows in schematic form the shuttle cylinder 129 and the shuttle chains 149 and 150. It can be clearly seen by a person skilled in the art that any movement of the shuttle cylinder rod 129, which is under the programmed control of the computer (not shown), and the attached chain 149, 150 and sprocket assemblies 160,161 in the longitudinal direction A (right horizontal in FIG. 25) will cause the four chain anchors 79 (which are attached to the shuttle 54) to move laterally in the direction C while movement of the cylinder rod 129 in the longitudinal direction B will cause the shuttle 54 (not shown) to move laterally in the direction D. Due to the arrangement of the chains 149,150 around the sprocket assemblies 160,161 the shuttle movement distance will always be twice that of the movement distance of the shuttle cylinder rod 129.

FIG. 26 illustrates a top view and FIG. 27 a side view of the spreader assembly 56. The spreader 56 consists of a rectangular frame 171 with suitable reinforcing cross beams 171a. It carries on each corner a twistlock assembly 199 (shown in more detail in FIG. 28). The location of these four twistlock assemblies 199, in relation to each other, is such that they will precisely match the locations of the upper holes in the corner castings (fittings) of a conventional I.S.O. freight container.

In the prototype configuration shown in the drawings and described above and below, the spreader 56 (FIGS. 26 and 27) is moved by means of a hydraulic cylinder 177 which is activated by a computer (see FIG. 16). For the working prototype, the range of movement was approximately four feet (due to the constraints of the building, as mentioned above) but this movement would normally be approximately nine feet or more in order to clear the bottom of the shuttle end structures when connecting with a container on a truck. Alternative configurations are envisaged, in which the hydraulic spreader cylinder 177 may be replaced by a hydraulic motor or by a winch or winches, but the principle of the spreader 56 being able to move upwards or downwards in relation to the hoist/shuttle assemblies 52,54 remains the same. This versatility of the spreader 56 enables the spreader 56 to make fine adjustments in elevation to deal with different levels of truck and railway cars, and to cope with non-aligned situations.

A conventional hinged hose carrier assembly, not shown, connects the spreader 56 and shuttle 54 assemblies just to the right of the spreader hoist cylinders 128 and 129 (see FIGS. 23 and 24) and provides a route of travel for the various hydraulic hoses and electrical cables which power the cylinders and sensors of the spreader assembly 56.

In the cylinder configuration as used in the prototype, the spreader elevator cylinder 177 is mounted in the approximate center of the spreader assembly 56 with side frames 171 and carries, on its rod end, a yoke 186. Four separate spreader elevator chains 175 are each attached to the yoke 186 by an adjustable chain anchor 185 and are taken laterally via pulleys 175a and then towards each corner of the spreader assembly 56 by suitably placed sprocket assemblies 181,182,183 and then around the sprocket assemblies 191,192 and vertically upwards to be attached respectively to each of the four spreader chain anchors 90 (see FIG. 22) of the shuttle assembly 54. Since the axis of the sprocket assemblies 181,182,183 is perpendicular to that of the sprocket assemblies 191,192, a 90 degree adapter assembly 173,174 is fitted in each length of chain in a position approximately as shown in FIG. 26. With this arrangement, it will be seen that any extension or retraction of the rod of spreader cylinder 177, under the programmed control of the computer 500, will cause the spreader 56 to be raised or lowered relative to the shuttle 54 assembly by an equal amount.

On the centreline at each end of spreader frame assembly 171, there is mounted a respective guide bar 205 with wear pads 203,204 on the sides and end thereof. These guide bars 205 engage in slots (not shown) on the inner surface of the shuttle 54 end assemblies so as to control the lateral movement of the spreader 56 assembly relative to the shuttle assembly 54. This allows several inches of relative lateral movement when the spreader assembly 56 is lowered and very little when it is raised.

As mentioned briefly above, a separate twistlock assembly 199 is mounted at each corner of the spreader assembly 56. This is shown in more detail in FIG. 28. Each twistlock assembly 199 consists of a vertical shaft with a pointed and shouldered head on its lower end 215. This shaft may be rotated through 90 degrees by the cylinder 208 via a suitable conventional linkage 195, 209, 211, 212, 213, 214 or command from the computer 500 so as to engage or release, as required, the top corner castings of a standard I.S.O. freight container. The twistlock mechanism 199 is conventional and is essentially the standard means used for attaching a lifting mechanism to the top corner castings of an I.S.O. freight container. The twistlocks in this particular application carry a pair of arms 201,202 (see FIG. 26) on their upper extremities which may be detected by the electronic sensors 198,210 which are connected to the computer 500 so that the computer 500 will at all times know whether the twistlocks ·199 are locked or unlocked.

Four deposit pressure sensors 199a are mounted in the underside of the spreader 56 frame adjacent to each twistlock 199 assembly. These sensors respectively each detect one of the top corner castings of a container when the spreader 56 is on a container and whether the twistlock pin 215 adjacent to the deposit sensor has fully entered the hole in the casting and is thus free to rotate to or from the locked position. The deposit sensors 199a are so positioned and designed that they will not sense the presence of the proximate corner casting when a container is suspended from the spreader 56.

Figure 29:
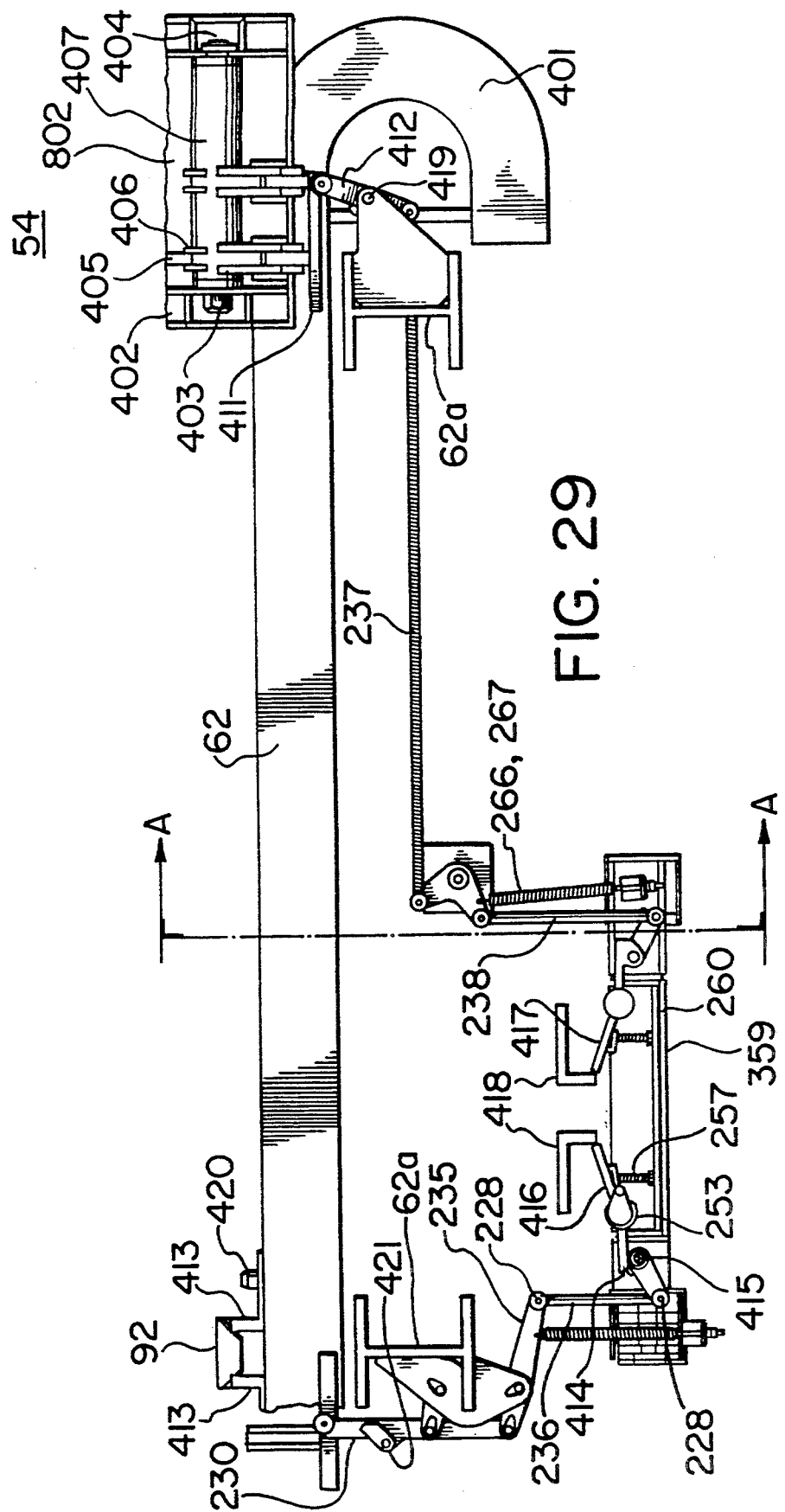
FIG. 29 illustrates a side view of a typical brake linkage assembly for a tier.

FIG. 29 illustrates a brake linkage general assembly viewed from the side of a carrier track (identified as carrier track 62 in FIG. 16, or any of tiers 12 through 30 in FIG. 1) and FIG. 30 illustrates a view through section A—A of FIG. 29. An endless loop carrier track 62 is also illustrated in FIG. 36 and discussed below. The curved portion 401 of the tier rail is shown at the right of FIG. 29 with a lower corner 402 of the leg 68 of the shuttle 54 just above it. A pair of supporting cross rails 62a are shown in end view. The paddle assembly 92 (see FIG. 22) on this corner of the shuttle 54 may rotate through 90 degrees on a horizontal shaft 404 (only the head of which is shown). This shaft is secured by nut 403. The rotation of the paddle 92 is caused by the movement of a paddle cylinder 400a (see FIG. 34) mounted within the shuttle assembly 54. The rod end 405 of this cylinder may be seen in FIG. 30 and it will be apparent to a person skilled in the art that an approximately vertical movement of this rod end, acting upon the lugs 406, will cause the paddle assembly body 407 to rotate about the shaft 404. Rotation of the paddle assembly, through a linkage system 408,409,410 causes the brake actuating foot 411 to move vertically up or down. When the paddle 92 is raised, it is retracted into the shuttle end assembly 71 (see FIG. 22) and thus makes no contact with a container or a container saddle 413 (identified as saddle 64 in FIG. 16) and the brake actuating foot 411 is raised to lie flush with the bottom of the shuttle end assembly 71 so that it will pass over the brake actuating levers 412 and 230 without touching them. When the paddle 92 is lowered approximately to the horizontal, the brake actuating foot 411 is lowered to a height at which it will contact the brake actuating levers 412 and 230 at specified points of the shuttle 54 travel. The paddle 92, when in the lowered position will be in a position to contact the raised portion of a container saddle 413 at a specified point of the shuttle 54 travel.

The relative positions of the paddle 92, the brake actuating foot 411, the container saddles 413 and the brake actuating levers 412 and 230 are so arranged that the container saddles 413 and any containers (not shown) in storage upon them are at all times restrained by either the tier brake assembly or by the shuttle 54 assembly through the paddles 92.

In FIG. 29, the shuttle 54 is shown for illustration purposes only with the brake actuating foot 411 superimposed upon the top of the inward brake actuating lever 412, a position in which it would never be in practice. If the shuttle 54 were entering the tier (in FIG. 29 this would be coming from the right hand edge) without a container it would have its paddles 92 and brake actuating feet 411 raised. The brake actuating foot 411 would therefore pass above the inward brake actuating lever 412 and would stop above, and clear of, the outward brake actuating lever 230. When the shuttle 54 stops, the paddle 92 would be positioned just clear of the outside corner of the endmost container in this tier. The similar paddle (not shown) on the right side of the shuttle end 54 assembly would be just clear of the opposite corner of the container and the shuttle position sensors would indicate to the computer 500 that the shuttle/spreader assemblies 54, 56 were in the correct position to take out the container.

The computer 500 then causes the spreader 56 to descend until the four deposit sensors 199a indicate that all four twistlocks 199 are fully engaged in the respective corner castings of the container. It then causes the twistlocks 199 to lock and the spreader hoist cylinder 177 to raise the spreader 56 just sufficiently to take the weight of the container off the container saddles 413 and almost simultaneously it lowers the paddles 92 at each corner of the container to be taken out. The paddles 92, in their lowered position, engage the raised backs of the container saddles 413 and also the sides of the bottom corner castings of the container itself (not shown). As the paddles 92 descend, so do the brake actuating feet 411 on each corner of the shuttle 54 end assemblies.

The brake actuating foot 411, now positioned immediately above the outward brake actuating lever 230, pushes the brake actuating lever 230 straight downwards and thus, via the various linkages shown on the left of FIG. 29, raises the tie rod 236 and rotates the shaft 415 via the lever 228. A cam 414 on the shaft 415 lifts the left hand end of the outward brake shoe 416. As the outward brake shoe 416 is pivoted on a shaft running through the housing 253, raising the left hand end causes the right hand end to descend by an approximately equal amount against the pressure of the spring 257 to a position in which it will be clear of the inverted container saddles 418 (also identified as saddles 413 on the top side of carrier track 62) in the lower part of the tier rail (not shown). The container dollies in this tier, together with the containers upon them, are now free to move towards the hoist under the control of the lowered paddles 92. Since there is at this time no requirement for the containers in this tier to move away from the hoist, the inward brake actuating lever 412 will not move when the brake actuating foot (not shown) on the right hand side of the shuttle 54 comes down. The upper portion of this lever 412 is designed to break away about the shaft 419 against the pressure of a return spring (not shown).

The shuttle assembly 54 is then moved to the center of the hoist 52 pulling, via the paddles 92, all the container saddles 418 of this carrier tracks 62 and, of course, all the containers stowed thereon. The length of the brake actuating foot 411 is such that it will maintain the outward brake actuating lever 230 in the down position until both parts of the inverted container saddle 418 have cleared the outward brake shoe 416. As soon as the brake actuating foot 411 has cleared the lever 230, the springs 257, 266 and 267 will cause the outward brake shoe 416 and the outward brake actuating lever 230 to return to their upper positions. The outward brake shoe 416 will thus be in position to engage the next container saddle 418 to come along the lower tier rails and thus prevent any overrun of the containers remaining in the tier's carrier tracks 62. The brake shoes 416 are carried within a housing 260 which is free to move slightly within an outer housing 259. This movement is restricted by plastic pads in compression and the whole is designed to arrest the movement of a full tier of loaded containers without undue shock. Outwardly moving container saddles 418 passing the inward brake shoe 417 simply force it downwards against the return spring pressure until they are clear of it, at which point it will spring back up to prevent any reverse motion of the container dollies.

The inward brake actuating lever 412 will return to its normal position as soon as the brake actuating foot 411 on the right hand side of the shuttle end assembly 54 has cleared it and will then breakaway again whilst the brake actuating foot 411 passes over it.

When a container is being placed in a tier's carrier tracks 62, the sequence of actions is as follows. The shuttle 54 will, as it is carrying a container, have its paddles 92 and brake actuating feet 411 in their lowered positions. The positioning of the paddles 92, saddles 413, levers, linkages, etc., is such that the leading paddles 92 will just clear the tops of the container saddles 413 (identified as saddles 64 in FIG. 16) waiting on the curved portion of the carrier tracks rails 62 and the container itself will just clear the retaining knob 420. The paddles 92 will contact the raised portion of the next container saddle 413 as this saddle will not have entered the curved portion 401 of the tier rail 62 and, just before this contact, the brake actuating foot 411 will contact the inward brake actuating lever 412. This lever 412 can only break away towards the hoist 52 and will therefore, when pushed outwards by the shuttle 54, cause the inward brake shoe 417 to move to the disengaged position in a manner generally similar to that described above for the outward brake 416. The outward brake shoe 416 will remain in the engaged position except when a container saddle 413 is passing in an inward direction and is forcing it downwards against the return spring. (The terms inward and outward are used here to describe the movement of containers and saddles on the upper rails 62—the empty saddles 418 on the lower carrier tracks rails, which actually contact the brake shoes 417, are of course moving in the opposite directions). The length of the brake actuating foot 411 is such that the inward brake shoe 417 will be held in the disengaged position until both halves of the saddle 418 have cleared it. The further movement of the shuttle 54, via the paddles 92, forces all the container saddles 413 in this tier's carrier tracks 62 to move away from the hoist 52, together with any containers already in storage in this tier's carrier tracks 62. As the leading saddles 418 come up around the curved portion 401 of the tier rail, the locating knobs 420 enter the holes in the bottom of the bottom corner castings of the container to provide a positive location of the container on the saddles 413.

As the shuttle 54 approaches its maximum travel, the leading brake actuating foot 411 will contact the outward brake actuating lever 230. As the outward brake should remain in the engaged position to prevent any unwanted outward movement of the containers, the upper portion of the outward brake actuating lever 230 is designed to break away about the pivot 421 when forced away from the hoist 52. When the shuttle position sensors indicate that the shuttle 54 is in the correct position, the container will be deposited.

The spreader assembly 56 is lowered slightly to place the full weight of the container onto the saddles 413 and the twistlocks 199 of the spreader 56 are unlocked. The paddles 92 of the shuttle 54 are raised, bringing the brake actuating feet 411 to their retracted positions and thus clear of the brake actuating levers 412, 230 and the spreader 56 is raised to the top of its travel. The shuttle/spreader assembly 54, 56 is now completely free from the deposited container and the computer 500 will cause it to return to the mid-position of the hoist assembly 52.

A number of alternative brake assembly configurations can be envisaged by a person skilled in the art but the principle remains the same as that currently in operation and described above.

The saddle system 413, 418 described in FIGS. 16 (saddles 64) and 29 involve an endless chain (see FIG. 15) which travels along the top side and the underside of carrier track 62. It is understood by a person skilled in the art that other arrangements for distributing the saddles 64 or 413, 418 as the case may be, can be used. For instance, the saddles 64 can be stacked in a spring loaded magazine and used as required by leading and trailing bottom castings of a container. As containers are moved onto a tier's carrier track 62, the saddles 64 in the magazine are used up as required by the bottom castings of the containers. As the containers are moved off the tier's carrier tracks 62, the saddles 64 can be stacked back into the magazine. In a sense, the containers 1, 2, 3 and 4 and the saddles 64 act together as a linked chain. The containers are spaced by the saddles and the length of the chain of alternating containers and saddles 64 are built up as containers are stored on a tier's carrier tracks 62, and shortened as containers are moved off a tier by the spreader 56, shuttle 54 assembly.

FIGS. 31, 32 and 33 illustrate side, bottom and end views of a hoist latch assembly 141, 159, which was previously discussed briefly above in association with FIG. 24. In FIG. 24, the hoist latch assemblies were identified with reference numbers 141 and 159. The hoist latch assembly illustrated in FIGS. 24, 31, 32 and 33 and described in detail below is the one currently being tested on the working prototype. Various alternative mechanisms can be envisaged by a skilled artisan but in all of these the principle remains the same in that the hoist assembly 52 must be positively locked into the main tier structure at any tier so that the shuttle rails 139 of the hoist mechanism 52 are precisely positioned at the same height as the shuttle rails 60 of the current tier and so that the lateral forces of the shuttle 54 transfer mechanism may be transmitted into the tier structure through the hoist latch assemblies 141, 159 rather than through the shuttle guide rollers 73.

In the configuration shown in FIGS. 31, 32 and 33, the hoist latch assembly 141, 159 consists of a substantial rectangular housing 274 carrying an hydraulic cylinder 279 at one end and a pair of latches 271 at the other end. The cylinder rod 280 is directly connected to a substantial pin 278 which is free to slide within the cylindrical housing 275. The pin 278 is shaped so as to engage the inner ends (not visible) of the latches 271 and carries a tapered nose cone on its outer end. The latches 271 are free to rotate, within limits, about the pins 272. On one side of the assembly there are mounted a pair of electronic sensors 281 so positioned as to be able to monitor the position of the pin 278. The sensors 281 are connected to the computer 500.

In operation, when the hoist assembly 52 has arrived at a tier selected by the computer 500, each of the four hoist latch cylinders 279 is caused to extend the pin 278 from the cylindrical housing 275 so that the tapered nose cone 276 and the neck of the pin 278 enter a locating bush (not visible) in the hoist guide rail 58. It will be apparent from FIG. 32 that the lateral extension of the pin 278 between the pair of latches 271 will force the outer ends of these latches 271 apart. The shoulder (not visible) of the pin 278 pushes against the inner ends (not visible) of the latches 271 so that when the pin 278 is fully engaged in a hoist guide rail 58 bushing, the latches 271 are fully extended so that their central part 277 is lying more or less parallel to the pin 276 and their outer ends 273 are securely hooked into slots (not shown) in the four vertical hoist guide rails 58. In this position, it will be apparent that the four hoist latches 141, 159, and therefore the hoist assembly 52 to which the hoist latches are bolted, are securely locked into the hoist guide rails 58 and cannot move in any direction. In this position, the sensors 281 will indicate to the computer 500 that the hoist latches are fully engaged and that therefore the shuttle mechanism 54 may be activated.

When the computer 500 has determined that operations at a particular tier are completed and that the hoist 52 should be moved to a different tier the hoist latches 141, 159 may be unlocked. The hoist latch cylinder 279 is activated so as to retract the pin 278 into the cylindrical housing 275. As the pin 278 retracts, it pulls against the inner ends (not visible) of the latches 271 causing them to pivot about the pins 272 so that they lie against the tapered nose cone 276 as the latter clears the bushing (not shown) of the respective hoist guide rail 58. When the pin 278 is fully retracted, the sensors 281 will indicate to the computer 500 that the respective hoist latches 141, 159 are clear of the respective hoist guide rails 58 and the hoist assembly 50 may therefore be raised or lowered.

Figure 34:
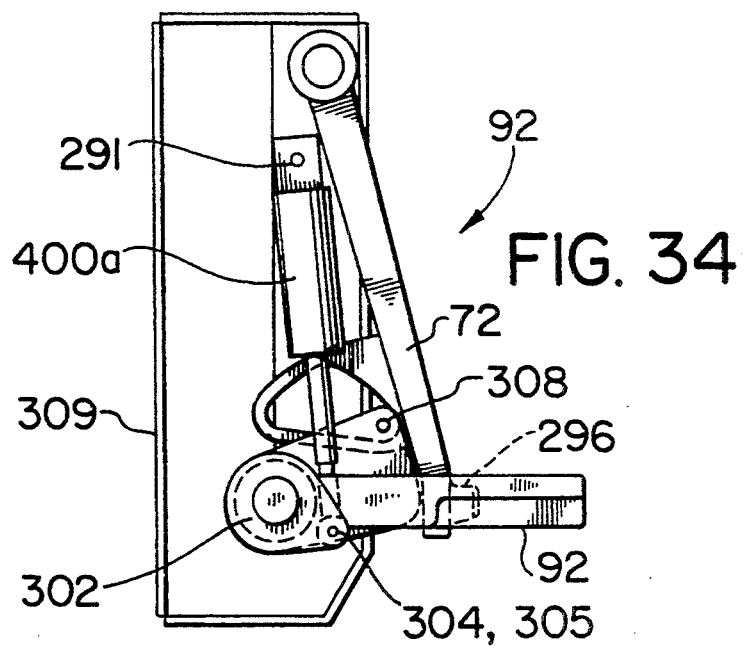
FIG. 34 illustrates a side view of the right paddle assembly.
Figure 35:
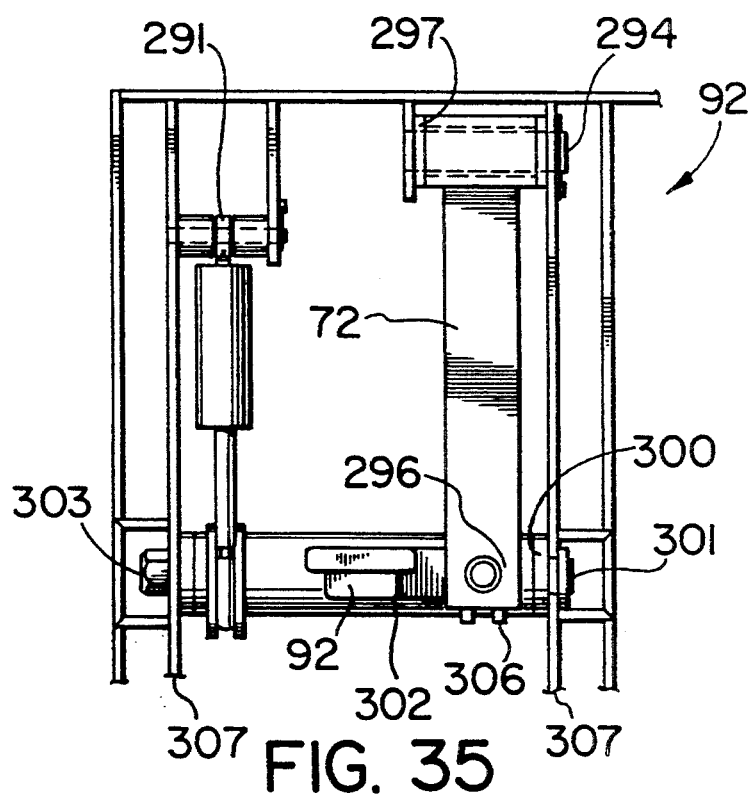
FIG. 35 illustrates a end view of the right paddle assembly.

FIGS. 34 and 35 illustrate enlarged side and front views of a paddle assembly 92, which was also illustrated in FIG. 22 under reference numbers 72, 92 and which was also mentioned in the description of the tier brake actuation above (FIG. 29). The paddle 92 itself is a substantial arm mounted perpendicular to a shaft 302 which also carries a number of lugs (not shown) to which the brake actuating foot 411 is connected by a series of linkages. The shaft 302 also carries a pair of lugs 306 to actuate the flipper 72 and another pair 304 to which the rod end of the cylinder 291, 400a is attached by means of an adjustable fitting 305. The shaft 302 is mounted on a long bolt 301, secured by a nut 303, between two vertical brackets 307 which themselves form a part of the shuttle end structure 54 (see FIG. 29). The bolt 301 also carries shock absorbing pads 300 at either end of the shaft 302. A flipper 72 may be mounted as shown on the pin 294 so as to rotate vertically about pin 294 under the influence of the cam 308 as the main shaft 302 rotates about the bolt 301. Shock absorbing pads 297 are fitted on either side of the flipper 72. As will be apparent from FIG. 34, when the cylinder 291 is retracted the shaft 302 will be rotated counterclockwise (in the view shown) and the paddle 92 will be raised to the vertical position. The cam 308 will be close to the outer plate 309 of the shuttle 54 end structure and will have pulled the flipper 72 to the left so that it and the paddle 92 are completely within the shuttle end structure 54. With the cylinder 291 in the extended position, however, the above components will be more or less in the positions shown in FIG. 34, with the paddle 92 lowered to the horizontal position (and accordingly lying close to the bottom corner casting of a container suspended from the spreader 56) and the flipper 72 will have been forced out from the shuttle end structure 54 by the cam 308 so that the knob 296 on the lower end of the flipper 72 will have entered an end hole of the bottom corner casting of a container (not shown) to give longitudinal restraint to the container.

FIG. 34 illustrates in particular, in side view, pin 304, and securing cotter pin 305 which enable the cylinder 291 to be connected to paddle 92. Paddle 92 engages a standard gripping port in the casting of a standard cargo container and is activated from a lower to an upper position, and vice versa, by cylinder 291, upon command from the computer 500.

FIG. 36 illustrates a general side view of a carrier track 62, as also shown in FIG. 16. This carrier track is representative of the tracks that are installed in the tiers of the cargo storage structure. The length of the carrier track will be dependent upon the number of containers 67 (numbered as containers 1, 2, 3 and 4 in FIG. 16) which the system has been designed to accommodate on each tier. As seen in FIG. 36, the carrier track 62 has positioned spatially along the length thereof a series of saddles 64, mounted on carriers (dollies) 310, which are shown in detail in FIGS. 38-41 and are described in more detail below. The carriers 310 are spaced apart a distance equivalent to the width of a standard I.S.O. freight container so that, when a container 67 is placed in the tier, the two bottom corner castings 66 at each end of the container 67 will be supported on and between the two saddles 64. The carriers 310 are connected by, and spatially oriented by, an endless chain 63, which runs between and around a pair of sprocket wheels 65. FIG. 37 illustrates a section view of sprocket wheel 65 and axle 67. The axle 67 of the sprocket on one side of the tier carrier track 62 is connected to the axle of the sprocket on the opposite side of the tier carrier track 62 by means of a torque tube (not shown). The force required to move the carriers 310 and any containers 67 which are stored in the tier is provided by the movement of the shuttle assembly 54 via the paddles 92 as previously described above. It will be seen on the extreme right of FIG. 36 that a container 68, when moved by the shuttle 54 from right to left into the tier carrier track 62, will just clear the knob of the waiting saddle 64a whilst the trailing wheels 310a of the carrier are in the curved section of the track 401 but the leading face of the bottom corner casting will contact the vertical part of the saddle and will cause the saddle 64a to rise to the position shown as 64b. In this position, the knob on the saddle 64a will have entered the hole in the bottom of the standard corner casting. There is sufficient clearance in the tier carrier track 62 to allow such movement at this point.

Figure 38:
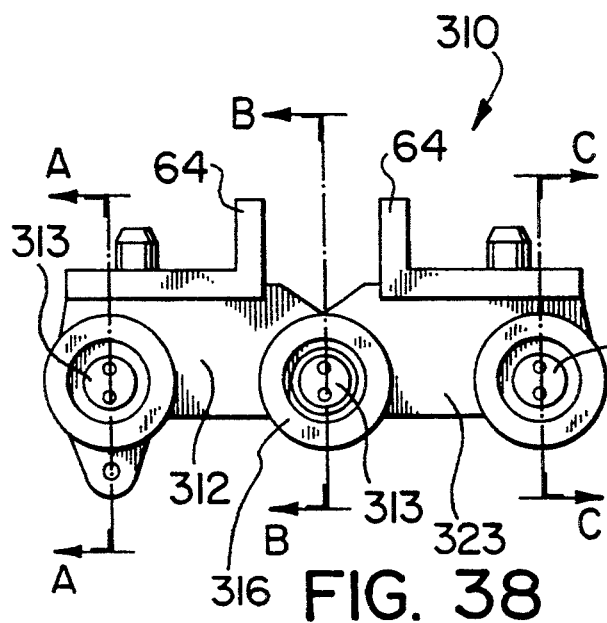
FIG. 38 illustrates a side view of the carrier link assembly.

FIG. 38 illustrates a detailed side view of the carrier link assembly 310, which carries a typical back-to-back L-shaped container saddle pair 64. The assembly 310 rides on three pairs of aligned wheels 316, along a carrier track 62 (see FIG. 36). The movement of the carrier 310 in contact with the shuttle assembly 54 is controlled by the paddles 92 of the shuttle assembly and, as all the carriers 310 in a tier carrier track 62 are connected by the endless chain 63 (see FIG. 36), all will move an equal distance simultaneously together with any containers in storage in the tier. The two halves 312 and 323 of the carrier 310 are free to pivot about the centre axle 313.

Figure 39:
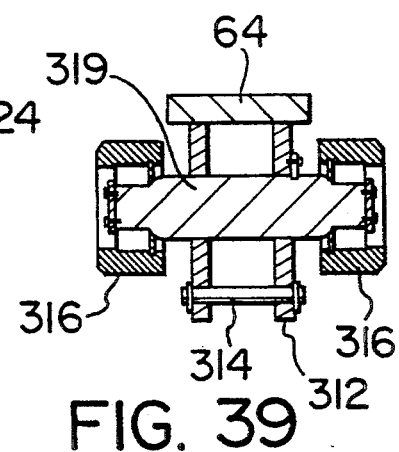
FIG. 39 illustrates a section view taken along section A—A of FIG. 38.

FIG. 39 illustrates a section view taken along section line A—A of FIG. 38. As will be seen, this half of the carrier 310 has two vertical plates 312 supporting the saddle 64. At the outer end, the vertical plates 312 are extended downwards to accommodate a pin 314 to which the roller chain 63 (FIG. 38) is anchored. An axle 313 (see FIG. 40) and 319 (see FIG. 39) is attached transversely at each end of the plates 312.

Figure 40:
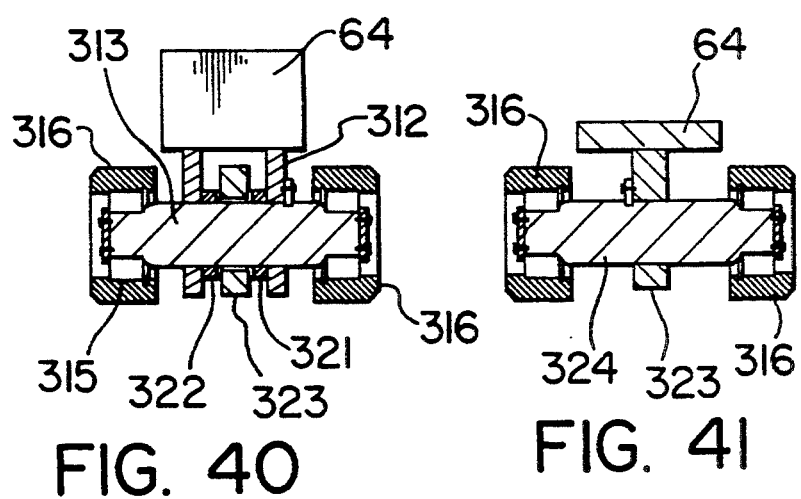
FIG. 40 illustrates a section view taken along section B—B of FIG. 38.

FIG. 40 illustrates a section view taken through section B—B of FIG. 38. It shows the way in which the two halves of the carrier 310 fit together about the centre axle 313. Each of the axles 313, 319 and 324 carries a roller 316 on each end, on suitable bearings, so that each carrier has a total of six rollers which ride in the carrier track 62 (FIG. 38).

Figure 41:
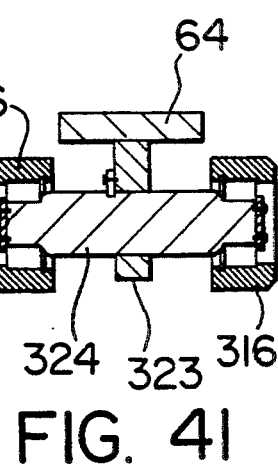
FIG. 41 illustrates a section view along section C—C of FIG. 38.

FIG. 41 illustrates a section view taken through section C—C of FIG. 38. This half of the carrier has only one vertical plate 323 to support the saddle 64. At the outer end, the plate 323 carries an axle 324 and at the inner end a boss 321 (FIG. 40) which fits between the two vertical plates 312 (FIG. 39) and which contains a pair of bushings (not shown) and is free to pivot about the axle 313.

As mentioned previously, an endless track system is not the only method of enabling the containers to be stored on a tier. Other systems obvious to a skilled artisan can be used.

Figure 42:
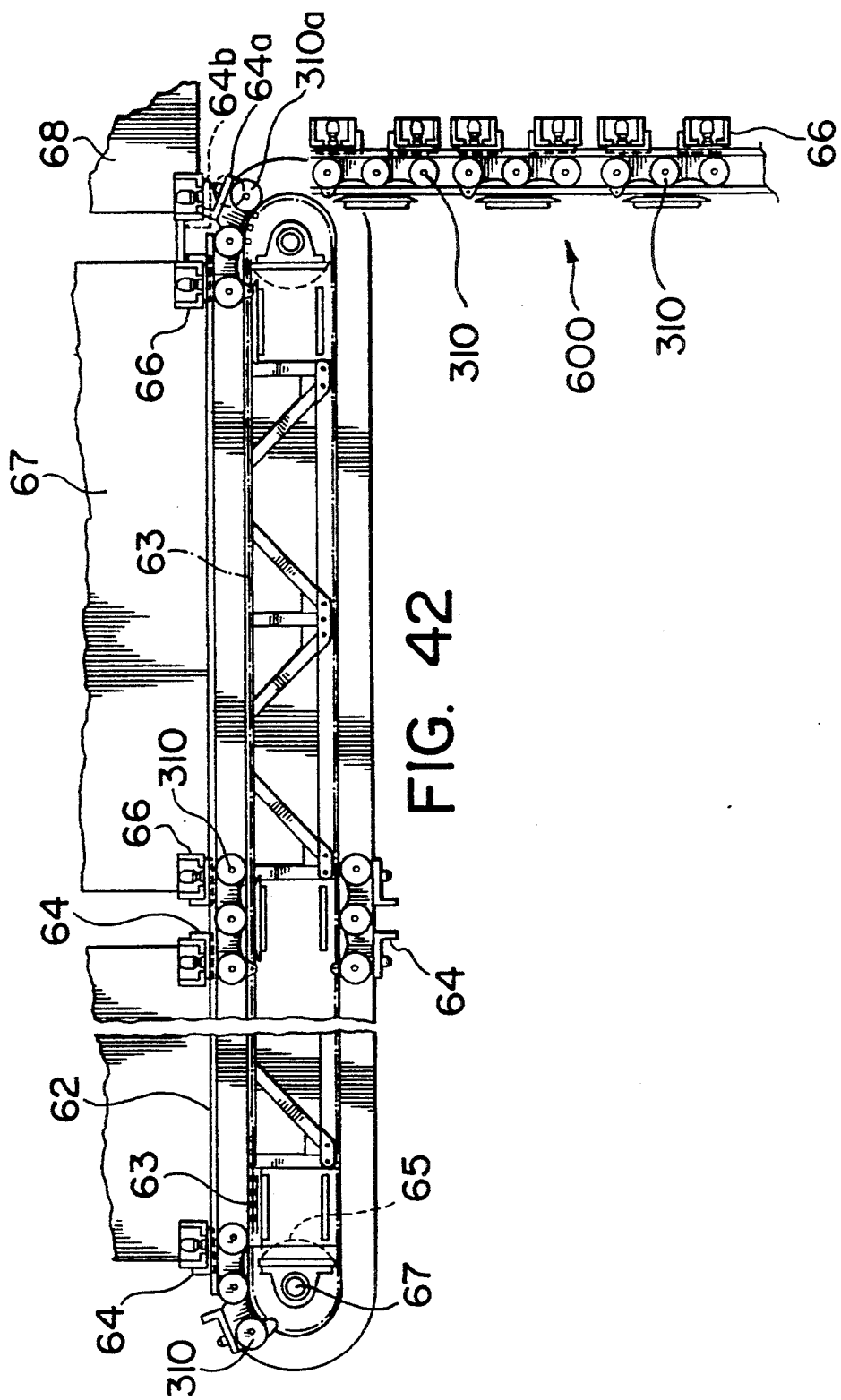
FIG. 42 illustrates a side view of an embodiment of the invention wherein container dollies on a tier are stored in a magazine.

FIG. 42 illustrates a side view of a system whereby the dollies 310, when not in use, are stored in a magazine 600. The dollies 310a are taken up by the containers 67 and 68 as required, and when not required, are returned to the magazine 600. The bottom corner casting of the container 68 is shown contacting the saddle 64 of the dolly 310 coming out of the magazine 600.

It will be understood that other systems are also possible. In any system, it is important that the containers are not moved by shoving one against another on the tier, that they are stored on their four corner castings, and that they are handled only by the eight top and bottom corner castings which are designed for this purpose. Saddles 64, paddles 92 and twist locks 199 are the preferred way of handling the containers.

METHOD OF OPERATION OF CONTAINER HANDLING AND STORAGE SYSTEM

Reception of Container from Road Transport

Upon arrival at the terminal gate, or some other designated place, an inbound truck driver with a container is assigned a number by the computer 500. An identification disk or plate or similar device is attached to the vehicle by magnetic or other means and the driver is instructed to obey the signals bearing his number only. The number will appear ahead of the vehicle at every turn with a directional arrow or sign wherever applicable. The driver will typically proceed on green, slow on amber, and stop on red. The progress of the vehicle will be monitored electronically as its identification plate passes strategically located sensors or by such other means as may be preferred from time to time and/or place to place.

When the guidance system indicates that the truck has entered the designated aisle 32 in the multiple-aisle tier storage system and has come to a standstill with its container in the assigned bay, the transfer of the container to storage proceeds as follows:

1. The hoist assembly 50 descends to the "truck level" carrying the hoist 52, shuttle 54 and, within it, the spreader 56. The spreader 56 descends and, aided if necessary by the built-in gathering mechanism, the four twistlock pins 215 enter the standard lifting slots in the four top corner castings of the container.

2. When the sensing devices at each corner indicate that the spreader is properly in position, the four twistlock pins 215 close to the locked position and the spreader 56 rises, lifting the container with it. The hoist assembly 50 starts to rise towards the assigned tier.

3. When the bottom of the container is at the correct height relative to the shuttle 54 and regardless of the position of the hoist 50 or the height of the container, the spreader 56 ceases to rise and the four paddles 92 are lowered to the horizontal, in which position they lie close alongside the bottom corner castings of the container.

4. When the hoist 52 has been raised to a predetermined level at which the shuttle 54 and the suspended container are clear of vehicular traffic, the truck driver is given the signal to proceed and leave the container suspended under the hoist assembly 50.

5. When the hoist assembly 52 reaches the level of the assigned tier, it stops and the four tier locks 141, 159 engage locating holes in the vertical guide rails 58 to ensure vertical alignment with the tier carrier tracks 62. These tier locks are designed to positively locate and secure the hoist assembly 50 at the correct level and additionally to lock the hoist 10 laterally into the guide rails 58 on either side so that the container shuttling forces may be evenly transmitted onto the structure as a whole.

6. When all four tier locks 141, 159 are fully engaged, the shuttle 54 moves laterally on horizontal guide rails 60 in the assigned direction carrying with it the spreader 56 and the suspended container. The shuttle 54 is sustained within the hoist assembly 50 by a plurality of wheels 73 at each end which run in rails or tracks in the hoist unit 52. These rails align with similar rails 60 in the tier structure at each level and as the shuttle 54 moves sideways some of the wheels enter the tier structure rails 60 and are supported thereby. The container is still suspended by the four twistlocks 215 from the spreader 56 in the conventional manner and all lateral forces are applied by the shuttle 54 to the bottom corner castings of the container via the paddles 92. The container remains in the normal upright position at all times and is not subjected to any damaging racking stresses.

7. As the leading side of the moving container reaches a certain position on the tier, the bottom corner castings and the leading edge of the paddles 92 on that side contact the saddles 64 of the first available tier carrier dolly 310 of each carrier track 62.

8. The brake activating foot 411 at each of the two leading corners of the shuttle 54 at this point engages one of the inward brake actuating levers which release the inward brakes of this tier only, and the two leading paddles 92 force the tier carrier dollies 310 to move laterally along the tier carrier track 62. These dollies 310 carry with them any other containers which may be already in storage in this tier. Again, all lateral forces are applied directly to the bottom corner castings of each container, so there are no diagonal stresses applied to the containers.

9. The tier carrier dollies 310 engaged by the leading edge of the incoming container are raised to the horizontal position as they move around the curved section of the carrier tracks 62 and during this movement their locating pins engage with the slot in the underside of the bottom corner castings. This ensures that the container is positively located on its dollies 310 at all times while in storage. The chain linkage 63 between the tier carrier dollies 310 causes the next inverted pair of dollies 310 to be pulled along the lower tier rails and thence around the curved section so as to come into the horizontal position immediately beneath the bottom corner castings.

10. At this point, the lateral movement of the shuttle 54 ceases and the spreader 56 is lowered slightly to allow the full weight of the incoming container to be taken by the saddles 64 of the four tier carrier dollies 310 positioned beneath its four bottom corner castings and to allow the twistlock pins 215 engaged in the four top corner castings to be free of any weight.

11. The twistlock pins 215 rotate to the unlocked position, and the paddles 92 are raised to the vertical. Raising the paddles 92 causes the flipper 72 to retract into the shuttle 54 and the brake activating foot under each paddle will rise to clear the brake actuating levers, allowing the brake shoes to rise to the engaged position.

12. The spreader 56 then rises to lift the twistlock pins 215 clear of the container.

13. The shuttle 54 then moves laterally out of the tier and returns to the centre of the hoist unit 52.

14. The tier dogs 271 retract into the hoist unit 52 and the system is now ready to handle the next container.

Delivery of Container to Road Transport

Upon arrival at the terminal gate to collect a container or at some other designated place, the truck driver is assigned a number and an identification device is attached to his vehicle in the same way as described above and the progress of the truck through the terminal is similarly controlled and monitored.

If the required container is not already so positioned, the computer 500 will move designated containers as required within the system so as to position the required container adjacent to the hoist 52.

When the required container is in position and the truck is ready to enter the designated aisle 32, the appropriate direction signals will cause the driver to enter the designated aisle 32 and stop in the correct bay.

When the guidance system indicates that the truck is in position, delivery of the container is made as follows:

1. The hoist unit 52 is raised or lowered as required to the appropriate tier and the tier locks 141 engage in the location holes in the guide rails 58.

2. The shuttle 54 moves laterally along horizontal guide rails 60 into the tier until the spreader 56 is positioned immediately over the required container.

3. The spreader 56 is lowered until all four deposit sensors 199a indicate that it is properly positioned on the container with all four twistlock pins 215 properly engaged in the top four corner castings of the container.

4. The twistlock pins 215 rotate to the locked position.

5. The paddles 92 are lowered to the horizontal at each corner of the container to engage the saddles 64 and this action causes the outward brake actuating foot 416 on each end to force down the outward brake actuating lever and thus release the outward brakes for this tier only.

6. The spreader 56 rises slightly to take the full weight of the container and the shuttle 54 moves laterally along rails 60 to the centre of the hoist unit 52. The outward brake actuating feet will run clear of the outward brake actuating levers, allowing the outward brake shoes 416 to rise to the engaged position ready to engage the next container carrier. Because they are engaged in the saddles 64, the trailing paddles 92 cause all container carriers 310 in this tier to move laterally towards the hoist unit. As the container carriers under the trailing corner castings of the suspended container enter the curved portion of the carrier tracks 62, the saddles 64 descend slightly so as to clear both the suspended container and the trailing paddles 92. All container carriers 310 in this tier are now disengaged from the moving shuttle 54 and at this point the next container carrier 310 at each end will contact the outward brake shoe and the lateral movement of all container carriers in this tier, together with any containers stored upon them, will be arrested. The shock absorbing mechanism of the tier brake assemblies has been proven capable of safely and smoothly arresting the lateral movement of a tier full of loaded containers.

7. The tier paddles 92 disengage, the hoist safety locks 141 disengage and the hoist unit 52 is lowered to the "truck level". As the hoist unit 52 descends, the paddles 92 are raised.

8. The spreader 56 is lowered until the container is deposited on the truck and the deposit sensors 199a indicate that the weight is completely off the twistlock pins 215.

9. The twistlock pins 215 rotate to the unlocked position. The spreader 56 rises clear of the container and simultaneously the hoist unit 52 rises to lift the shuttle 54 clear of truck traffic. The system is now ready to handle the next container.

Sorting Containers Within the System

When the computer 500 is instructed to move a specified container from a position other than adjacent to the hoist 52 in any tier, it will first determine the best position in which to place the container currently adjacent to the hoist (the transient) in the tier of the specified container, having regard at all times to any programmed factors pertaining to this and/or other containers.

Using the same sequences of moves as described above, with the exception of any reference to the "truck height", the computer 500 will cause the mechanism to lock onto the transient container and to bring that container into the hoist unit. The hoist unit will then move to the tier chosen for storage of the transient and the mechanism will shift the transient into the tier and will then return to the centre of the hoist unit.

If this has not left the specified container adjacent to the hoist 52, then the above sequence will be repeated with the next transient, and so on, until the specified container is adjacent to the hoist.

The specified container will then be delivered out of the system or moved as above to a different location within the system, as required.

As will be apparent to those skilled in the art in the light of the foregoing disclosure, many alterations and modifications are possible in the practice of this invention without departing from the spirit or scope thereof. For example, aisle 32 need not divide rack 10 into left and right halves, as depicted in the drawings. Instead, the aisle may be on one side or the other of rack 10, with no container storage levels on the opposite side of the aisle. It is however expected that greater container storage capacity and more efficient container shuffling and grouping capability will be attained by providing container storage levels on both sides of aisle 32. As another example, the apparatus may be extended, to provide additional container storage capacity and greater shuffling and grouping flexibility, by placing a plurality of multi-level storage racks identical to rack 10 side by side such that aisle 32 extends longitudinally through the entire group of racks.

An intermodal facility may be incorporated, possibly externally to the tier structure. One such facility has the lower tier on one side extended laterally by one 'container slot' so that a container in this position may be lifted out of the system by a travelling gantry or some other device and placed upon an adjacent railcar or elsewhere. An auxiliary mechanism may be provided in this case so that the container carriers in the intermodal tier may be moved laterally by the computer without the necessity to position the hoist unit at the intermodal tier.

The operation of the hoist 52 and shuttle 54 may be programmed on computer 500 for storage, retrieval and/or shuffling of containers in any desired fashion.

Containers may be grouped in any desired manner to expedite their transfer between rack 10 and the container ship(s). For example, containers may be grouped according to their destination port, their outbound shipping dates, their ports of origin, or any other desired parameter. The programming may also be optimized, with the aid of known queuing and programming techniques, to minimize the displacement of elevator 34, or to maximize the speed of the shuffling operation as containers are stored, retrieved and/or shuffled into groups. Accordingly, the scope of the invention is to be construed in accordance with the substance defined by the following claims.

We claim:

1. Apparatus for handling and storing International Standards Organization (ISO) cargo containers having four top corners and four bottom corners and fittings at all eight corners comprising:
   (a) a cargo container storage rack having a top, a bottom, a first end and a second end and at least two locations for storage of cargo containers;
   (b) at least one cargo container transport aisle extending through or adjacent said storage rack from the bottom to the top thereof and from the first end to the second end of said rack;
   (c) a plurality of cargo container storage positions on each of said locations and on one or both sides of said aisle, said cargo container storage positions being spaced from each other and being laterally displaceable, toward or away from said aisle in unison, at each of said locations;
   (d) means for lateral displacement of said spaced container storage positions, and means for lateral displacement further comprising cargo container corner fitting engaging and holding saddles thereon, said saddles being adapted to engage the four bottom corner fittings of a container;
   (e) cargo container elevator means for accepting cargo containers by engaging at least four opposite corners of a cargo container, said four corners being on the same level of said cargo container, and displacing the cargo container vertically within said aisle; and
   (f) cargo container transfer means associated with the container elevator means for laterally transferring cargo containers between said cargo container elevator means and a selected side of a selected location, to engage or disengage the fittings of the four bottom corners of a cargo container with or from said cargo container corner fitting engaging and holding saddles at said location.

2. An apparatus as claimed in claim 1 wherein the movement and storage positions of the cargo containers are controlled by a programmed computer.

3. Cargo container storage apparatus as defined in claim 1 wherein said cargo container storage positions are defined by said corner fitting engaging and holding saddles interconnected by endless loops such that transfer of a cargo container from said cargo container transfer means onto said selected side of said selected location displaces cargo containers previously transferred onto said selected side of said selected location away from said aisle one cargo container storage position, and removal of a cargo container from said selected side of said selected location by said cargo container transfer means displaces cargo containers previously transferred onto said selected location one cargo container storage position towards said aisle.

4. Container storage apparatus as defined in claim 1 wherein said container elevator means and said container transfer means comprise:
   (a) a shuttle which is adapted to engage at least four corner fittings of a container and move the container laterally in relation to the storage rack; and
   (b) a hoist which carries the shuttle and a container if applicable and is adapted to move the shuttle, the container and itself, upwardly or downwardly.

5. An apparatus as claimed in claim 4 wherein the container elevator means and container transfer means includes a spreader which is connected to the shuttle and is adapted to move vertically in relation to the shuttle.

6. An apparatus as claimed in claim 4 wherein the hoist is of a generally rectangular configuration, and is adapted to move upwardly or downwardly on four vertically extending guide rails which are positioned at each corner of the hoist.

7. An apparatus as claimed in claim 6 wherein the shuttle is of a generally rectangular configuration which is oriented in alignment with the rectangular hoist and is adapted to move laterally in either direction relative to the hoist.

8. An apparatus as claimed in claim 5 wherein:
   the hoist is of a generally rectangular configuration, and is adapted to move upwardly or downwardly on four vertically extending guide rails which are positioned at each corner of the hoist;
   the shuttle is of a generally rectangular configuration which is oriented in alignment with the rectangular hoist and is adapted to move laterally in either direction relative to the hoist; and,
   the spreader is of a generally rectangular configuration which is aligned with the shuttle and hoist, the spreader being adapted to be raised or lowered relative to the shuttle and hoist.

9. An apparatus as claimed in claim 8 wherein horizontal guide rails extend laterally to an exterior of the rack from each of the four vertical guide rails, the horizontal guide rails being adapted to receive the shuttle when the hoist raises or lowers the shuttle into alignment with the horizontal guide rails.

10. An apparatus as claimed in claim 9 wherein:
    the storage positions are defined by laterally extending carrier tracks;
    the vertical and horizontal guide rails are operatively associated with the laterally extending carrier tracks; and,
    endless chains are movably disposed on said carrier tracks and said corner fitting engaging and holding saddles are attached to the endless chains.

11. An apparatus as claimed in claim 10 wherein the shuttle has extending downwardly therefrom, at each corner thereof, four arms which carry means for releasably engaging or gripping at least four of the corner fittings of a cargo container.

12. An apparatus as claimed in claim 11, further comprising power means for moving the spreader, shuttle and hoist either in unison or independently of one another, which power means derive power from a power source.

13. An apparatus as claimed in claim 12 wherein the power means comprises sprockets, chains and hydraulic cylinders, the sprockets, chains and hydraulic cylinders being driven by hydraulic pumps or motors.

14. An apparatus as claimed in claim 12 wherein the spreader, shuttle and hoist are connected to a computer which is programmed to control the respective of positions of the spreader, shuttle and hoist by activating the power means.

15. Apparatus for handling and storing International Standards Organization cargo containers which have four top corners with fittings and four bottom corners with fittings comprising:
    (a) a multi-level cargo container storage rack;
    (b) at least one container transport aisle extending along said rack from top to bottom and between opposed ends of said rack;
    (c) a plurality of cargo container storage positions on each level of said rack, said cargo container storage positions being spaced from one another and horizontally displaceable, toward or away from said aisle, along each of said levels;
    (d) cargo container elevator means for engaging at least four fittings of a cargo container and vertically displacing the cargo container within said aisle to a selected one of said rack levels; and
    (e) cargo container transfer means for reversibly transferring a cargo container between said cargo container elevator means and said selected rack level; and
    (f) said cargo container storage positions on each specific rack level having cargo container corner fitting engaging and holding saddles thereon, said saddles engaging the four bottom corner fittings such that transfer of a cargo container from said container transfer means onto said selected rack level displaces, away from said aisle, cargo containers previously transferred onto said rack level, and transfer of a cargo container from said selected level onto said container transfer means displaces toward said aisle, cargo containers remaining on said selected level, said saddles maintaining spatial relationship between adjacent cargo containers on said rack level.

16. Container storage apparatus as defined in claim 15 wherein said container elevator means and said container transfer means comprise:
    (a) a shuttle which is adapted to engage at least four corner fittings of a container and move the container laterally in relation to the storage rack; and
    (b) a hoist which carries the shuttle and a container if applicable and is adapted to move the shuttle, the container and itself, upwardly or downwardly.

17. An apparatus as claimed in claim 16 wherein the container elevator means and container transfer means includes a spreader which is connected to the shuttle and is adapted to move vertically in relation to the shuttle.

18. An apparatus as claimed in claim 17 wherein:
    the hoist is of a generally rectangular configuration, and is adapted to move upwardly or downwardly on four vertically extending guide rails which are positioned at each corner of the hoist;
    the shuttle is of a generally rectangular configuration which is oriented in alignment with the rectangular hoist and is adapted to move laterally in either direction relative to the hoist; and,
    the spreader is of a generally rectangular configuration which is aligned with the shuttle and hoist, the spreader being adapted to be raised or lowered relative to the shuttle and hoist.

19. An apparatus as claimed in claim 18, further comprising;
    power means for moving the spreader, shuttle and hoist either in unison or independently of one another, which power means derive power from a power source; and
    a computer programmed to control the respective positions of the spreader, shuttle and hoist by activating the power means.

* * * * *